United States Patent
Li et al.

(10) Patent No.: US 12,301,996 B2
(45) Date of Patent: May 13, 2025

(54) OPTICAL IMAGE STABILIZATION APPARATUS AND CONTROL METHOD BASED ON REFLECTOR ROTATIONS

(71) Applicant: HUAWEI TECHNOLOGIES CO., LTD., Guangdong (CN)

(72) Inventors: Ming Li, Wuhan (CN); Wenzhe Liao, Wuhan (CN); Jun Feng, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 187 days.

(21) Appl. No.: 17/586,108

(22) Filed: Jan. 27, 2022

(65) Prior Publication Data

US 2022/0150413 A1    May 12, 2022

Related U.S. Application Data

(63) Continuation of application No. PCT/CN2020/097284, filed on Jun. 20, 2020.

(30) Foreign Application Priority Data

Jul. 31, 2019   (CN) ......................... 201910704671.9

(51) Int. Cl.
*H04N 23/68*   (2023.01)
*G02B 7/09*   (2021.01)
(Continued)

(52) U.S. Cl.
CPC ............. *H04N 23/687* (2023.01); *G02B 7/09* (2013.01); *G03B 5/00* (2013.01); *H04M 1/0264* (2013.01);
(Continued)

(58) Field of Classification Search
CPC ...... H04N 23/687; H04N 23/54; H04N 23/55; H04N 23/6812; G02B 7/09; G02B 7/08;
(Continued)

(56) References Cited

U.S. PATENT DOCUMENTS 5,523,887 A   6/1996 Wight
6,130,993 A   10/2000 Hayakawa
(Continued)

FOREIGN PATENT DOCUMENTS

CN    1474997 A    2/2004
CN    1764871 A    4/2006
(Continued)

OTHER PUBLICATIONS

Office Action issued in Chinese Application No. 201910704671.9 on Jun. 16, 2021, 14 pages (with English translation).
(Continued)

*Primary Examiner* — Padma Haliyur
(74) *Attorney, Agent, or Firm* — Fish & Richardson P.C.

(57) ABSTRACT

An optical image stabilization apparatus includes a first lens, a first reflector, a position sensor, a control component, and a housing configured to enclose the first lens and the first reflector, where the position sensor is connected to the control component. An optical signal is transmitted to the first reflector after passing through the first lens. The first reflector reflects the received optical signal, and the reflected optical signal is projected onto an imaging plane. The position sensor is configured to detect shaking information of the first lens and send the shaking information to the control component. The control component is configured to control, based on the shaking information, the first reflector to rotate by using a first preset direction as an axis, where the first preset direction is a direction that is not parallel to a normal direction of the first reflector.

14 Claims, 13 Drawing Sheets

(51) Int. Cl.
*G03B 5/00* (2021.01)
*H04M 1/02* (2006.01)
*H04N 23/54* (2023.01)
*H04N 23/55* (2023.01)

(52) U.S. Cl.
CPC ............. *H04N 23/54* (2023.01); *H04N 23/55* (2023.01); *H04N 23/6812* (2023.01); *G03B 2205/0007* (2013.01); *H04M 2250/52* (2013.01)

(58) Field of Classification Search
CPC ............................... G02B 27/646; G03B 5/00; G03B 2205/0007; G03B 2205/0023; G03B 3/10; H04M 1/0264; H04M 2250/52; H04M 1/72454
See application file for complete search history.

(56) References Cited

U.S. PATENT DOCUMENTS

| | | |
|---|---|---|
| 2002/0171413 A1 | 11/2002 | Ikegame |
| 2008/0030872 A1 | 2/2008 | Nishioka et al. |
| 2008/0129831 A1 | 6/2008 | Cho et al. |
| 2009/0122406 A1* | 5/2009 | Rouvinen ............ H04N 23/687 359/555 |
| 2011/0181955 A1 | 7/2011 | Cho et al. |
| 2011/0211821 A1 | 9/2011 | Park et al. |
| 2016/0381346 A1 | 12/2016 | Hsu et al. |
| 2018/0329276 A1* | 11/2018 | Hu .......................... G03B 17/17 |
| 2019/0361225 A1* | 11/2019 | Cho ..................... G02B 7/1805 |
| 2020/0014850 A1* | 1/2020 | Zhang .................. G02B 27/646 |
| 2020/0033588 A1* | 1/2020 | Wippermann ..... H04N 23/6811 |

FOREIGN PATENT DOCUMENTS

| | | |
|---|---|---|
| CN | 1847970 A | 10/2006 |
| CN | 1987631 A | 6/2007 |
| CN | 101201462 A | 6/2008 |
| CN | 101324698 A | 12/2008 |
| CN | 103676405 A | 3/2014 |
| CN | 104040404 A | 9/2014 |
| CN | 106303220 A | 1/2017 |
| CN | 206248987 U | 6/2017 |
| CN | 107003587 A | 8/2017 |
| CN | 108828874 A | 11/2018 |
| CN | 108931875 A | 12/2018 |
| CN | 108965663 A | 12/2018 |
| CN | 209402619 U | 9/2019 |
| EP | 3258312 A1 | 12/2017 |
| JP | H11305278 A | 11/1999 |
| JP | 2000010139 A | 1/2000 |
| JP | 2002228903 A | 8/2002 |
| JP | 2008242207 A | 10/2008 |
| JP | 2009244490 A | 10/2009 |
| KR | 20090084494 A | 8/2009 |

OTHER PUBLICATIONS

Office Action issued in Chinese Application No. 201910704671.9 on Oct. 26, 2021, 10 pages (with English translation).
Extended European Search Report issued in European Application No. 20847630.9 on Sep. 2, 2022, 12 pages.
Office Action in Japanese Appln. No. 2022-506065, mailed on Feb. 7, 2023, 9 pages (with English translation).
EP Communication Pursuant to Article 94(3) EPC in European Appln No. 20847630.9, dated Jul. 26, 2024, 5 pages.

* cited by examiner

OPTICAL IMAGE STABILIZATION APPARATUS AND CONTROL METHOD BASED ON REFLECTOR ROTATIONS

CROSS-REFERENCE TO RELATED APPLICATIONS

This application is a continuation of International Application No. PCT/CN2020/097284, filed on Jun. 20, 2020, which claims priority to Chinese Patent Application No. 201910704671.9, filed on Jul. 31, 2019. The disclosures of the aforementioned applications are hereby incorporated by reference in their entireties.

TECHNICAL FIELD

This application relates to the optical field, and in particular, to an optical image stabilization apparatus and a control method.

BACKGROUND

A digital camera function of a mobile phone means whether the mobile phone can shoot a static picture or a video clip by using a built-in or external digital camera. As a new additional function of the mobile phone, in recent years, a photographing capability of the mobile phone has become one of indicator features that consumers care about most. In terms of hardware, implementation of photographing of the mobile phone relies on a camera module to complete image collection, and in terms of software, relies on an algorithm operation to finally achieve photographing experience used by a user. In addition to an imaging function, most important technologies in a current camera module of the mobile phone include zooming, image stabilization, and focusing technologies.

However, as the user is increasingly dependent on the mobile phone, there are increasingly strong requirements for different focal lengths of the camera module, especially in terms of telephoto photographing. However, there are also several technical difficulties that need to be overcome in terms of ultra-telephoto photographing. One is to enhance shaking sensitivity, and another one is to further refine a focusing requirement.

In a photographing process of the mobile phone, a complementary metal oxide semiconductor (CMOS) chip requires specific response time, and requires even longer exposure time especially in dark-scene photographing. In long time of exposure, if image jitter occurs, data transmitted by an image sensor blurs, and imaging quality is severely degraded. However, a human body inevitably shakes in a process of performing photographing by using a hand, and this phenomenon is more serious especially in telephoto photographing. Therefore, an image stabilization technology needs to be loaded to the camera module of the mobile phone to eliminate such impact.

SUMMARY

Embodiments of this application provide an optical image stabilization apparatus. The optical image stabilization apparatus may be used in various camera lenses to resolve a problem of imaging quality degradation caused by image jitter.

In view of this, a first aspect of the embodiments of this application provides an optical image stabilization apparatus, and the optical image stabilization apparatus may include:

a first lens, a first reflector, a position sensor, and a control component, where the position sensor is connected to the control component.

The first lens is used for imaging, and may be specifically a convex lens, or may be a concave lens or a plane mirror, or may be one lens or a combination of a plurality of lenses. A form of the first lens and a quantity of first lenses are not specifically limited in this embodiment of this application. A shape of the first reflector may be a circle, a square, or another shape. A specific shape is not limited in this embodiment of this application.

After passing through the first lens, an optical signal is transmitted to the first reflector, and after being reflected by the first reflector, the optical signal is projected onto an imaging plane. In a process of transmitting the optical signal to the imaging plane, when the first lens shakes, the position sensor detects shaking information of the first lens, and sends the shaking information to the control component. The shaking information may include shaking parameters such as a shaking direction, a shaking frequency, and a shaking amplitude of the first lens. Then, the control component controls, based on the shaking information detected by the position sensor, the first reflector to rotate by using a first preset direction as an axis. The first preset direction is not parallel to a normal direction of the first reflector. Therefore, when the first reflector rotates, an angle of incidence and an angle of reflection of the optical signal on the first reflector may be changed. In other words, when the first reflector rotates, a direction of an optical path of the optical signal may be changed.

It can be learned from the foregoing descriptions that when the first lens shakes, the first reflector may be controlled, based on the shaking information of the first lens, to rotate, to change a direction of an optical path of an optical signal incident on the imaging plane, and compensate for deflection of the direction of the optical path that is caused by shaking of the first lens. Through compensation for the deflection of the direction of the optical path that is caused by shaking of the first lens, an amplitude of vibration that is on a position of a light spot formed by the optical signal on the imaging plane and that is caused by shaking of the first lens is reduced, and stability of the position of the light spot formed by the optical signal on the imaging plane is maintained, thereby achieving an image stabilization effect.

In a specific embodiment, when the first lens shakes, the control component may be further configured to control, based on the shaking information, the first reflector to rotate by using a second preset direction as an axis, where the second preset direction is not parallel to the first preset direction or the normal direction of the first reflector. Because the second preset direction is a direction that is not parallel to the normal direction of the first reflector, when driving the first reflector to rotate by using the second preset direction as the axis, a driving component may also change a propagation direction of the optical signal after the optical signal is reflected by the first reflector, to achieve a compensation effect in the foregoing descriptions that the first reflector rotates by using the first preset direction as the axis. It should be noted that, in this embodiment, rotational motion of the first reflector by using the first preset direction as the axis and rotational motion of the first reflector by using the second preset direction as the axis may be performed simultaneously or separately. This is specifically controlled by the control component based on the shaking information. In this embodiment, through control of the rotational motion of the first reflector by using the first preset direction as the axis and the rotational motion of the first reflector by using the second preset direction as the axis, a dual-axis optical image stabilization apparatus is provided.

In a specific embodiment, the optical image stabilization apparatus may further include an image sensor connected to the control component, and a photosensitive surface of the image sensor is the imaging plane.

After the optical signal is projected onto the imaging plane, that is, the photosensitive surface of the image sensor, the image sensor detects acutance information of an image formed after the optical signal is projected onto the photosensitive surface, and sends the acutance information to the control component. Therefore, the control component controls, based on the acutance information, the first reflector to move. When the first reflector moves, a length of the optical path of the optical signal changes as the first reflector moves, and the optical path is a propagation path of the optical signal from the first lens to the imaging plane.

It should be noted that a direction in which the first reflector moves may be preset, for example, may be set to the direction of the optical path or a normal direction of a reflection surface of the first reflector. When the first reflector moves, the length of the optical path of the optical signal also changes accordingly, that is, an image distance is changed, so that the optical signal can be clearly imaged on the photosensitive surface, thereby achieving a focusing effect.

In a specific embodiment, a specific type of the position sensor may be a CMOS, a charge-coupled device (CCD), another imaging apparatus, or another reflection apparatus. A type of the image sensor is not specifically limited in this embodiment of this application.

In a specific embodiment, the optical image stabilization apparatus may further include a second lens. The second lens is disposed between the first reflector and the imaging plane. After being reflected by the first reflector, the optical signal is projected onto the second lens, and after passing through the second lens, the optical signal is finally projected onto the imaging plane. It should be noted that the second lens plays a role of assisting with imaging, may be a convex lens or a concave lens, and may include one lens or a combination of a plurality of lenses. A specific quantity and a specific form are not limited herein.

In a specific embodiment, the optical image stabilization apparatus may further include a second reflector. The second reflector and the first reflector are respectively located on two sides of the first lens. After obtaining the optical signal, the second reflector reflects the obtained optical signal to the first lens. Then, the optical signal is reflected by the first reflector, and is finally projected onto the imaging plane.

When the first lens shakes, the control component may further control, based on the shaking information of the first lens that is detected by the position sensor, the second reflector to rotate in a second preset direction, where the second preset direction is not parallel to the first preset direction or a normal direction of the second reflector. Therefore, when the second reflector rotates, a direction of the optical path of the optical signal may also be changed through driving, to achieve an image stabilization effect. In addition, it should be noted that, rotational motion of the second reflector by using the second preset direction as an axis and the rotational motion of the first reflector by using the first preset direction as the axis may be performed simultaneously or separately. This is specifically controlled by the control component based on the shaking information. When the rotational motion of the second reflector by using the second preset direction as the axis and the rotational motion of the first reflector by using the first preset direction as the axis are performed simultaneously, a dual-axis image stabilization effect may be achieved through combination.

In a specific embodiment, the optical image stabilization apparatus may further include an image sensor connected to the control component, and a photosensitive surface of the image sensor is the imaging plane.

After the optical signal is projected onto the imaging plane, that is, the photosensitive surface of the image sensor, the image sensor detects acutance information of an image formed after the optical signal is projected onto the photosensitive surface, and sends the acutance information to the control component. Therefore, the control component controls, based on the acutance information, the first reflector to move. When the first reflector moves, a length of the optical path of the optical signal changes as the first reflector moves, and the optical path is a propagation path of the optical signal from the first lens to the imaging plane.

It should be noted that a direction in which the first reflector moves may be preset, for example, may be set to the direction of the optical path or a normal direction of a reflection surface of the first reflector. When the first reflector moves, the length of the optical path of the optical signal also changes accordingly, that is, an image distance is changed, so that the optical signal can be clearly imaged on the photosensitive surface, thereby achieving a focusing effect.

In a specific embodiment, the optical image stabilization apparatus may further include a second lens. The second lens is disposed between the first reflector and the imaging plane. After being reflected by the first reflector, the optical signal is projected onto the second lens, and after passing through the second lens, the optical signal is finally projected onto the imaging plane. It should be noted that the second lens plays a role of assisting with imaging, may be a convex lens or a concave lens, and may be one lens or a combination of a plurality of lenses. A specific quantity and a specific form are not limited herein.

In a specific embodiment, the optical image stabilization apparatus may further include a second lens. The second lens is disposed on an outer side of the second reflector, and the optical signal is projected onto the second reflector after passing through the second lens. Then, the optical signal reflected by the second reflector passes through the first lens, and is then reflected by the first reflector, and is finally projected onto the imaging plane. It should be noted that the second lens plays a role of assisting with imaging, may be a convex lens or a concave lens, and may be one lens or a combination of a plurality of lenses. A specific quantity and a specific form are not limited herein.

In a specific embodiment, the optical image stabilization apparatus may further include a second lens and a third lens. The second lens is disposed on an outer side of the second reflector, and the third lens is disposed on an optical path between the first reflector and the imaging plane. The optical signal sequentially passes through the second lens, the second reflector, the first lens, the first reflector, and the third lens, and is finally projected onto the imaging plane. It should be noted that the second lens and the third lens play a role of assisting with imaging, and each of the second lens and the third lens may be a convex lens or a concave lens, and may be one lens or a combination of a plurality of lenses. A specific quantity and a specific form are not limited herein.

In a specific embodiment, the optical image stabilization apparatus may further include a second reflector. The second reflector is located between the first reflector and the imaging plane. After being reflected by the first reflector, the optical signal is projected onto the second reflector, and is reflected by the second reflector to the imaging plane.

When the first lens shakes, the control component is further configured to control, based on the shaking information of the first lens that is detected by the position sensor, the second reflector to rotate by using a second preset direction as an axis, where the second preset direction is not parallel to the first preset direction or a normal direction of the second reflector. Therefore, when the second reflector rotates, a direction of the optical path of the optical signal may also be changed through driving, to achieve an image stabilization effect. In addition, it should be noted that, rotational motion of the second reflector by using the second preset direction as the axis and the rotational motion of the first reflector by using the first preset direction as the axis may be performed simultaneously or separately. This is specifically controlled by the control component based on the shaking information. When the rotational motion of the second reflector by using the second preset direction as the axis and the rotational motion of the first reflector by using the first preset direction as the axis are performed simultaneously, a dual-axis image stabilization effect may be achieved.

In a specific embodiment, the optical image stabilization apparatus may further include an image sensor connected to the control component, and a photosensitive surface of the image sensor is the imaging plane. After the optical signal is projected onto the imaging plane, that is, the photosensitive surface of the image sensor, the image sensor detects acutance information of an image formed after the optical signal is projected onto the photosensitive surface, and sends the acutance information to the control component. After receiving the acutance information detected by the image sensor, the control component controls, based on the acutance information, the first reflector and/or the second reflector to move. When the first reflector and/or the second reflector move/moves, a length of the optical path of the optical signal changes as the first reflector and/or the second reflector move/moves, and the optical path is a propagation path of the optical signal from the first lens to the imaging plane.

It should be noted that a direction in which the first reflector and/or the second reflector move/moves may be preset, for example, may be set to the direction of the optical path or a normal direction of a reflection surface of the first reflector and/or the second reflector. When the first reflector and/or the second reflector move/moves, the length of the optical path of the optical signal also changes accordingly, that is, an image distance is changed, so that the optical signal can be clearly imaged on the photosensitive surface, thereby achieving a focusing effect.

In a specific embodiment, the optical image stabilization apparatus may further include a second lens. The second lens is disposed between the first reflector and the second reflector. After being reflected by the first reflector, the optical signal passes through the second lens and is projected onto the second reflector, and after being reflected by the second reflector, the optical signal is finally projected onto the imaging plane. It should be noted that the second lens plays a role of assisting with imaging, may be a convex lens or a concave lens, and may be one lens or a combination of a plurality of lenses. A specific quantity and a specific form are not limited herein.

In a specific embodiment, the optical image stabilization apparatus may further include a second lens. The second lens is disposed between the second reflector and the imaging plane. After being reflected by the second reflector, the optical signal passes through the second lens and is finally projected onto the imaging plane. It should be noted that the second lens plays a role of assisting with imaging, may be a convex lens or a concave lens, and may be one lens or a combination of a plurality of lenses. A specific quantity and a specific form are not limited herein.

In a specific embodiment, the optical image stabilization apparatus may further include a second lens and a third lens. The second lens is disposed between the first reflector and the second reflector, and the third lens is disposed between the second reflector and the imaging plane. The optical signal sequentially passes through the first lens, the first reflector, the second lens, the second reflector, and the third lens, and is finally projected onto the imaging plane. It should be noted that the second lens and the third lens play a role of assisting with imaging, and each of the second lens and the third lens may be a convex lens or a concave lens, and may be one lens or a combination of a plurality of lenses. A specific quantity and a specific form are not limited herein.

Based on the optical image stabilization apparatus in the first aspect, a second aspect of the embodiments of this application provides a control component, and the control component may include:

a driving member and a processing chip.

The processing chip is configured to receive the shaking information of the first lens that is detected by the position sensor in the first aspect, and after processing the shaking information, the processing chip controls, based on a result of processing the shaking information, the driving member to drive the first reflector and/or the second reflector to implement the rotational motion described in the first aspect, thereby implementing an image stabilization function.

In a specific embodiment, the processing chip in the control component is further configured to receive acutance information that is of an image formed after an optical signal is projected onto a photosensitive surface and that is detected by an image sensor, and after processing the acutance information, the processing chip is further configured to control, based on a result of processing the acutance information, the driving member to drive the first reflector and/or the second reflector to perform moving motion of the first reflector described in the first aspect, thereby achieving a focusing effect.

In a specific embodiment, the control component may further include a voice coil motor (VCM) driver module, and the VCM driver module is connected to the processing chip.

The processing chip is further configured to receive acutance information that is of an image formed after an optical signal is projected onto a photosensitive surface and that is detected by an image sensor, and after processing the acutance information, the processing chip is further configured to control, based on a result of processing the acutance information, the VCM driver module to drive the first lens to move in a central axis direction of the first lens. When the first lens moves in the central axis direction of the first lens, a length of a propagation path of the optical signal between the first lens and the photosensitive surface changes, that is, an image distance changes, thereby achieving a focusing effect. It should be noted that, motion in which the VCM driver module drives the first lens to move along a central axis and motion in which the driving member drives the first reflector and/or the second reflector to move may be performed simultaneously or separately. When the motion in which the VCM driver module drives the first lens to move along the central axis and the motion in which the driving member drives the first reflector and/or the second reflector to move are performed simultaneously, a fine focusing function or a coarse focusing function may be implemented. Coarse focusing means that a larger focusing range is implemented.

Based on the control component in the second aspect, a third aspect of the embodiments of this application provides a driving member, and the driving member may include:

a first coil and a first magnet.

A first reflector is connected to a first outer frame by using a first cantilever, the first coil is fastened to a rear surface or an edge position of the first reflector, and the first magnet is fastened to the first outer frame.

The first coil is a "∞-shaped" coil, is divided into a left-half coil and a right-half coil, and is bilaterally symmetrical. After electricity is applied to the first coil, an inward ampere force perpendicular to the first reflector is generated under action of a magnetic field between the left-half coil and the first magnet, and an outward ampere force perpendicular to the first reflector is generated under action of a magnetic field between the right-half coil and the first magnet, to drive the first reflector to rotate around a second rotation axis.

After receiving shaking information of a first lens that is detected by a position sensor, a processing chip processes the shaking information, and controls, based on a processing result, an amount of electricity applied to the first coil. After electricity is applied to the first coil, under action of a magnetic field of the first magnet, ampere forces in opposite directions are respectively generated on a left half and a right half of the first coil, to drive the first reflector fixedly connected to the first coil to rotate by using a first preset direction as an axis. A rotation axis may be the first cantilever, and in this case, the first preset direction is a direction of the first cantilever. It should be noted that, that a processing chip controls, based on a processing result, an amount of electricity applied to the first coil includes controlling a current direction and a current value of a current in the first coil, to control a rotation direction of the first reflector and a value of a rotation angle of the first reflector.

In a specific embodiment, the driving member may further include a second coil. The second coil is fastened to a rear surface or an edge position of the first reflector and is insulated from the first coil. A support frame is connected to the first reflector by using a first rotation axis, and is connected to the first outer frame by using the second rotation axis. The second coil is an "8-shaped" coil, is similar to a shape obtained after the first coil is rotated by 90 degrees, is divided into an upper-half coil and a lower-half coil, and is longitudinally symmetrical. After electricity is applied to the second coil, an inward ampere force perpendicular to the first reflector is generated under action of a magnetic field between the upper-half coil and the first magnet, and an outward ampere force perpendicular to the first reflector is generated under action of a magnetic field between the lower-half coil and the first magnet, to drive the first reflector to rotate around the second rotation axis. After receiving shaking information of a first lens that is detected by a position sensor, a processing chip processes the shaking information, and controls, based on a processing result, an amount of electricity applied to the second coil. After electricity is applied to the second coil, under action of a magnetic field of the first magnet, ampere forces in opposite directions are respectively generated on an upper half and a lower half of the second coil, to drive the first reflector fixedly connected to the second coil to rotate by using a second preset direction as an axis. In this embodiment, the first preset direction is a direction of the second rotation axis, and the second preset direction is a direction of the first rotation axis.

In a specific embodiment, the driving member may further include a second coil and a second magnet. A second reflector is connected to a second outer frame by using a second cantilever, the second coil is fastened to a rear surface or an edge position of the second reflector, and the second magnet is fastened to the second outer frame. The second coil is an "8-shaped" coil. After receiving shaking information of a first lens that is detected by a position sensor, a processing chip processes the shaking information, and controls, based on a processing result, an amount of electricity applied to the second coil. After electricity is applied to the second coil, under action of a magnetic field of the second magnet, ampere forces in opposite directions are respectively generated on an upper half and a lower half of the second coil, to drive the second reflector fixedly connected to the second coil to rotate by using a second preset direction as an axis. In this embodiment, the second preset direction may be a direction of the second cantilever.

In a specific embodiment, the driving member may include a first coil, a first magnet, a second coil, and a third coil. For the first coil, the first magnet, and the second coil, refer to the foregoing related descriptions. Details are not described herein again. The third coil is fastened to a rear surface or an edge position of the first reflector, and is insulated from the first coil and the second coil. Alternatively, the third coil may be fastened to the support frame. After receiving acutance information that is of an image formed after an optical signal is projected onto a photosensitive surface and that is detected by an image sensor, the processing chip processes the acutance information, and controls, based on a processing result, an amount of electricity applied to the third coil. After electricity is applied to the third coil, an ampere force perpendicular to a plane on which the third coil is located is generated under action of a magnetic field of the first magnet, to drive the first reflector fixedly connected to the third coil to move. It should be noted that, that the processing chip controls, based on a processing result, an amount of electricity applied to the third coil includes controlling a current direction and a current value of a current in the third coil, to control a magnitude and a direction of movement of the first reflector.

In a specific embodiment, the third coil may alternatively be disposed on the second reflector, and may be specifically fastened to a rear surface or an edge position of the second reflector, and is insulated from the second coil.

In a specific embodiment, the optical image stabilization apparatus further includes a first outer frame and a support frame, and the driving member may include:

a first coil, a first electromagnet, a second electromagnet, a third electromagnet, and a fourth electromagnet.

The first coil is a rectangular coil or a square coil, and a current in a clockwise direction or a counterclockwise direction may flow through the first coil. The first reflector is connected to the support frame by using the second rotation axis, the support frame is connected to the first outer frame by using the first rotation axis, the first coil is disposed on and fastened to a rear surface or an edge position of the first reflector, and the first electromagnet and the second electromagnet are separately fastened to the first outer frame.

After receiving shaking information of a first lens that is detected by a position sensor, the processing chip processes the shaking information, and controls, based on a processing result, electricity applied to a coil that provides a magnetic field for the first electromagnet, the second electromagnet, the third electromagnet, and/or the fourth electromagnet, for example, controls a current value and a current direction, thereby generating a magnetic field in a preset direction around the first coil, so that ampere forces in different directions are respectively generated on four sides of the first coil, and the first reflector fixedly connected to the first coil is driven to perform motion of rotating or moving, thereby implementing an image stabilization function or a focusing function.

Based on related structures in the first aspect, the second aspect, and the third aspect, a fourth aspect of the embodiments of this application provides a control method, and the control method may include the following steps.

An optical image stabilization apparatus detects shaking information of a first lens. Specifically, when the first lens shakes, a position sensor in the optical image stabilization apparatus detects the shaking information of the first lens, such as a shaking displacement, a shaking frequency, and a shaking direction. It should be noted that the position sensor herein is not a specific sensor, but generally means a sensor that can detect the shaking information of the first lens.

After detecting and determining the shaking information of the first lens, the optical image stabilization apparatus determines a first control parameter based on the shaking information. Specifically, after receiving the shaking information detected by the position sensor, a processing chip processes the shaking information according to a preset first algorithm to obtain the first control parameter. The preset first algorithm may be subsequently updated by using a network or based on a setting parameter entered by a user. The first control parameter may be specifically a parameter indicating a first reflector to rotate. Specifically, the first control parameter may include rotation direction information and rotation angle information.

After determining the first control parameter, the optical image stabilization apparatus controls, based on the first control parameter by using a control component, the first reflector to rotate. Specifically, after determining the first control parameter, the optical image stabilization apparatus may determine, based on the first control parameter, a current direction and a current value of a current that needs to be loaded to a first coil and a current direction and a current value of a current that needs to be loaded to a second coil. This process may be implemented by using a preset third algorithm. The third algorithm may be subsequently updated by using a network or based on a setting parameter entered by a user.

In a specific embodiment, after an optical signal is projected onto a photosensitive surface of an image sensor, the image sensor detects acutance information of an image formed by the optical signal on the photosensitive surface. After receiving the acutance information detected by the image sensor, the processing chip processes the acutance information according to a preset second algorithm to obtain a second control parameter. The preset second algorithm may be subsequently updated by using a network or based on a setting parameter entered by a user. The second control parameter includes a parameter indicating the first reflector to move and a parameter indicating the first lens to move. Specifically, the second control parameter may include moving direction information and moving distance information. After determining the second control parameter, the optical image stabilization apparatus may determine, based on the second control parameter, a current direction and a current value of a current that needs to be loaded to a third coil and a current direction and a current value of a current that needs to be loaded to a VCM driver module. This process may be implemented by using a preset fourth algorithm. The fourth algorithm may be subsequently updated by using a network or based on a setting parameter entered by a user.

It can be learned from the foregoing technical solutions that the embodiments of this application have the following advantages:

The embodiments of this application provide an optical image stabilization apparatus, including a first lens, a first reflector, a position sensor, and a driving component. After passing through the first lens, an optical signal is reflected by the first reflector, and is then projected onto an imaging plane. The position sensor is configured to detect shaking information of the first lens and send the shaking information to the driving component. The driving component provides a driving force based on the shaking information, and drives the first reflector to rotate by using a first preset direction as an axis. Because the first preset direction is a direction that is not parallel to a normal direction of the first reflector, when the first reflector rotates by using the first preset direction as the axis, an angle of incidence and an angle of reflection of the optical signal on the first reflector also change with rotation; in other words, a propagation direction of the optical signal is changed through rotation of the first reflector in the optical image stabilization apparatus, and vibration of an optical path that is caused by shaking of the first lens may be compensated for by changing a direction of the optical path, thereby providing the optical image stabilization apparatus.

DESCRIPTION OF EMBODIMENTS

The following describes in detail an optical image stabilization apparatus provided in embodiments of this application with reference to accompanying drawings.

The optical image stabilization apparatus in the embodiments of this application may be applied to a plurality of types of lenses, including a periscope or various types of camera lenses, for example but not limited to being applied to a lens module in a mobile phone.

The following describes some terms included in the embodiments of this application.

Focusing is a process in which a distance between an imaging plane and a lens is changed based on different positions at which objects of different distances are clearly imaged at a rear part of the lens so that a photographed object is clearly imaged. Because a depth of field exists in all imaging systems, if the photographed object is beyond the depth of field, an image blurs after the object is photographed. To ensure clear presentation of the photographed object, focusing needs to be performed. Focusing is also referred to as focus adjustment. Through forward and backward fine adjustment on an image distance of an optical lens, photographing distances in a one-to-one correspondence are obtained based on a design value. In this way, the photographed object is kept in a range of the depth of field and is clearly imaged.

Figure 1:
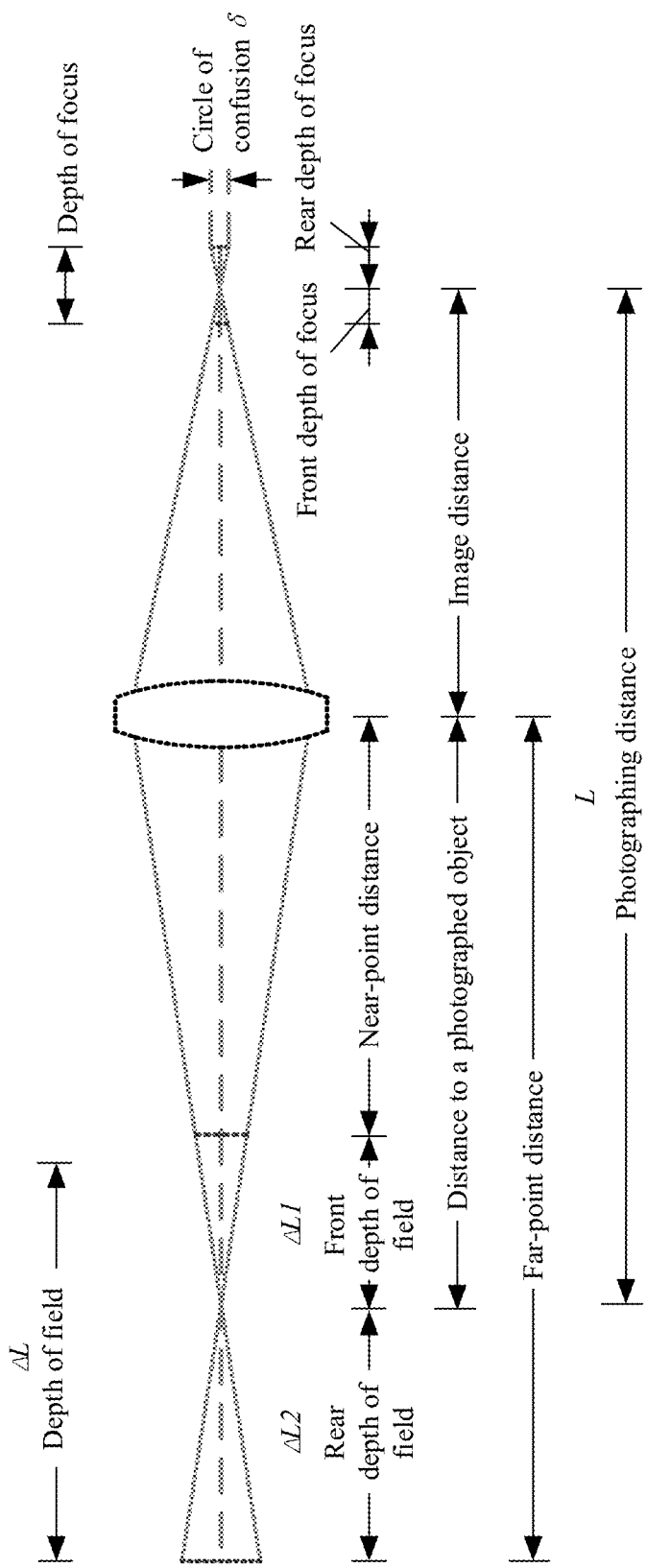
FIG. 1 is a schematic diagram of lens imaging.

A depth of field is a depth for clear imaging in an optical imaging system. The depth of field is a physical phenomenon, but different optical systems have different values of depths of field. FIG. 1 is a schematic diagram of lens imaging, in which ΔL represents the depth of field, and L represents a photographing distance. A value of the depth of field is related to a parameter focal length f of an optical lens and an f-stop (F-number) of the lens, and is also related to a diameter δ that is of a circle of confusion and that can be distinguished by a used image collector CMOS.

Relationships among ΔL, f, F, and δ are shown in the following formula 1, formula 2, and formula 3.

$$\Delta L_1 = \frac{F\delta L^2}{f^2 + F\delta L}. \qquad \text{Formula 1}$$

$$\Delta L_2 = \frac{F\delta L^2}{f^2 - F\delta L}. \qquad \text{Formula 2}$$

$$\Delta L = \Delta L_1 + \Delta L_2 = \frac{2f^2 F\delta L^2}{f^4 - F^2\delta^2 L^2}. \qquad \text{Formula 3}$$

Based on the foregoing descriptions, to obtain a high-quality image, a camera of a mobile phone needs to perform focusing. During photographing of images of different distances, a distance between the CMOS and a lens group differs. For example, in telephoto photographing, because an object distance is quite long, it can be learned according to an imaging formula $1/f = 1/v + 1/u$ (where f represents a focal length, which is a positive number for a convex lens or a negative number for a concave lens, u represents an object distance, and v represents an image distance, which is a positive number for a real image or a negative number for a virtual image) that the image distance is quite short. However, in macrophotographing, an object distance is quite short, and correspondingly, an image distance needs to be relatively long. This imposes requirements for fine focusing.

Figure 2A:
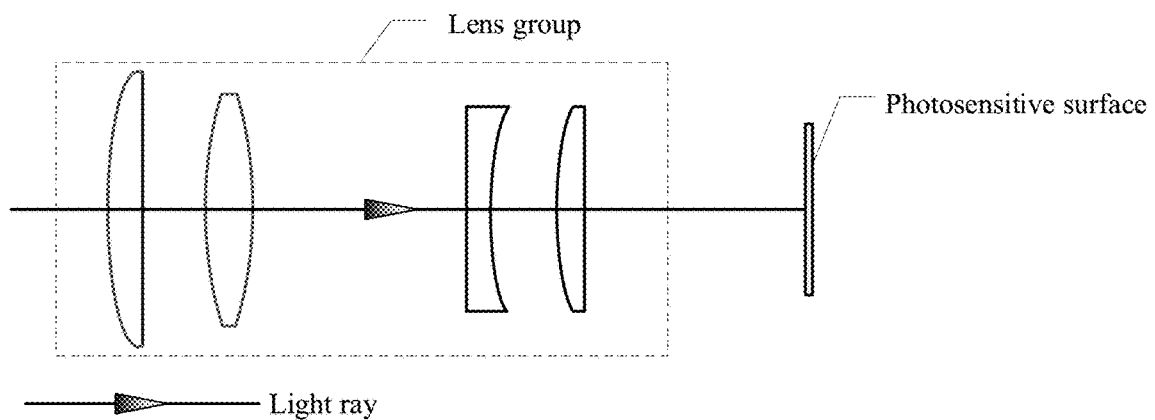
FIG. 2A is a schematic diagram of projection of a light ray after the light ray passes through a lens module.
Figure 2B:
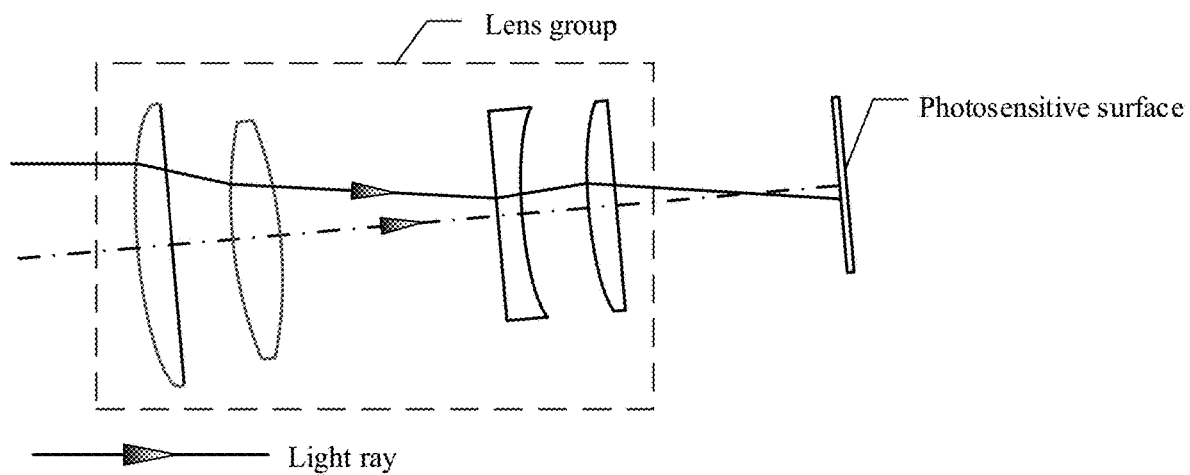
FIG. 2B is a schematic diagram of projection of a light ray after the light ray passes through a lens module after a lens shakes.

In addition, in a photographing process of the mobile phone, a CMOS chip requires specific response time, and especially in dark-scene photographing, requires even longer exposure time in a case of insufficient light, to obtain sufficient incident light. In long time of exposure, that is, in a case of slow shutter, if image jitter occurs within one period of shutter time, data transmitted by an image sensor blurs after a lens shakes, and imaging quality is seriously degraded, and a "paste" is generated. FIG. 2A is a schematic diagram of projection of a light ray after the light ray passes through a lens module. After shaking occurs, as shown in FIG. 2B, a projection point of the light ray on a photosensitive element is offset. However, a human body inevitably shakes in a process of performing photographing by using a hand, and this phenomenon is more serious especially in telephoto photographing. Therefore, an image stabilization technology needs to be loaded to a camera module of the mobile phone to eliminate such impact.

Figure 3A:
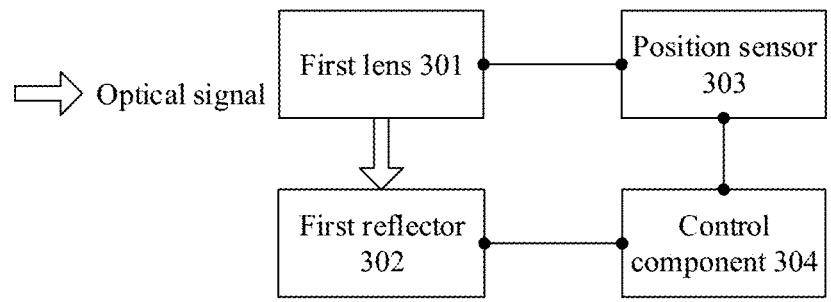
FIG. 3A is a schematic diagram of an optical image stabilization apparatus according to an embodiment of this application.

An embodiment of this application provides an optical image stabilization apparatus. Refer to FIG. 3A below for details. FIG. 3A is a schematic diagram of an embodiment of an optical image stabilization apparatus according to an embodiment of this application. The optical image stabilization apparatus includes:

a first lens 301, a first reflector 302, a position sensor 303, and a control component 304, where the position sensor 303 is connected to the control component 304.

The first lens 301 is used for imaging, and may be specifically a convex lens, or may be a concave lens or a plane mirror, or may be one lens or a combination of a plurality of lenses. A form of the first lens 301 and a quantity of first lenses 301 are not specifically limited in this embodiment of this application. A shape of the first reflector 302 may be a circle, a square, or another shape. A specific shape is not limited in this embodiment of this application.

After passing through the first lens 301, an optical signal is transmitted to the first reflector 302, and after being reflected by the first reflector 302, the optical signal is projected onto an imaging plane. In a process of transmitting the optical signal to the imaging plane, when the first lens 301 shakes, the position sensor 303 detects shaking information of the first lens 301, and sends the shaking information to the control component 304. The shaking information may include shaking parameters such as a shaking direction, a shaking frequency, and a shaking amplitude of the first lens 301. Then, the control component 304 controls, based on the shaking information detected by the position sensor 303, the first reflector 302 to rotate by using a first preset direction as an axis. The first preset direction is not parallel to a normal direction of the first reflector 302. Therefore, when the first reflector 302 rotates, an angle of incidence and an angle of reflection of the optical signal on the first reflector 302 may be changed. In other words, when the first reflector 302 rotates, a direction of an optical path of the optical signal may be changed.

It can be learned from the foregoing descriptions that when the first lens 301 shakes, the first reflector 302 may be controlled based on the shaking information of the first lens 301 to rotate, to change a direction of an optical path of an optical signal incident on the imaging plane, and compensate for deflection of the direction of the optical path that is caused by shaking of the first lens 301. Through compensation for the deflection of the direction of the optical path that is caused by shaking of the first lens 301, an amplitude of vibration that is on a position of a light spot formed by the optical signal on the imaging plane and that is caused by shaking of the first lens 301 is reduced, and stability of the position of the light spot formed by the optical signal on the imaging plane is maintained, thereby achieving an image stabilization effect.

In a specific embodiment, in the embodiment shown in FIG. 3A, when the first lens 301 shakes, the control component 304 may be further configured to control, based on the shaking information, the first reflector 302 to rotate by using a second preset direction as an axis, where the second preset direction is not parallel to the first preset direction or the normal direction of the first reflector 302. Because the second preset direction is a direction that is not parallel to the normal direction of the first reflector 302, when driving the first reflector 302 to rotate by using the second preset direction as the axis, a driving component may also change a propagation direction of the optical signal after the optical signal is reflected by the first reflector 302, to achieve a compensation effect in the foregoing descriptions that the first reflector 302 rotates by using the first preset direction as the axis. It should be noted that, in this embodiment, rotational motion of the first reflector 302 by using the first preset direction as the axis and rotational motion of the first reflector 302 by using the second preset direction as the axis may be performed simultaneously or separately. This is specifically controlled by the control component 304 based on the shaking information. In this embodiment, through control of the rotational motion of the first reflector 302 by using the first preset direction as the axis and the rotational motion of the first reflector 302 by using the second preset direction as the axis, a dual-axis optical image stabilization apparatus is provided.

Figure 3B:
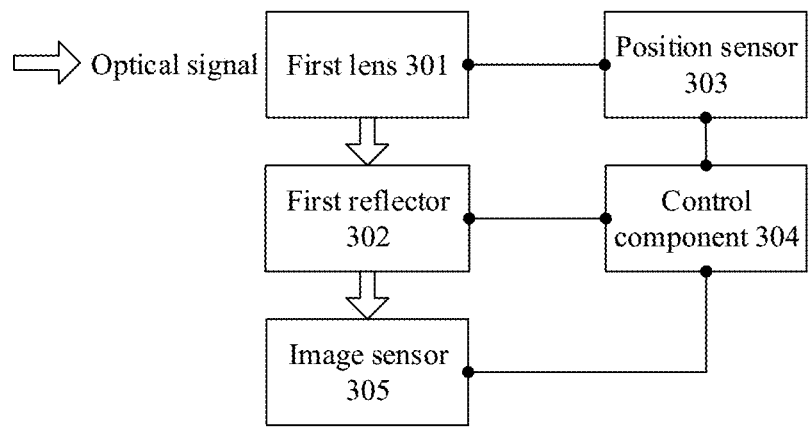
FIG. 3B is a schematic diagram of an optical image stabilization apparatus according to another embodiment of this application.

In a specific embodiment, based on the embodiment shown in FIG. 3A, reference is made to FIG. 3B below for details. FIG. 3B is a schematic diagram of another embodiment of an optical image stabilization apparatus according to an embodiment of this application. The optical image stabilization apparatus may further include:

an image sensor 305 connected to the control component 304, where a photosensitive surface of the image sensor 305 is the imaging plane.

After the optical signal is projected onto the imaging plane, that is, the photosensitive surface of the image sensor 305, the image sensor 305 detects acutance information of an image formed after the optical signal is projected onto the photosensitive surface, and sends the acutance information to the control component 304. Therefore, the control component 304 controls, based on the acutance information, the first reflector 302 to move. When the first reflector 302 moves, a length of the optical path of the optical signal changes as the first reflector 302 moves, and the optical path is a propagation path of the optical signal from the first lens 301 to the imaging plane.

It should be noted that a direction in which the first reflector 302 moves may be preset, for example, may be set to a direction of the optical path or a normal direction of a reflection surface of the first reflector 302. When the first reflector 302 moves, the length of the optical path of the optical signal also changes accordingly, that is, an image distance is changed, so that the optical signal can be clearly imaged on the photosensitive surface, thereby achieving a focusing effect.

In a specific embodiment, a specific type of the image sensor 305 may be a CMOS, a CCD, another imaging apparatus, or another reflection apparatus. A type of the image sensor 305 is not specifically limited in this embodiment of this application.

Figure 3C:
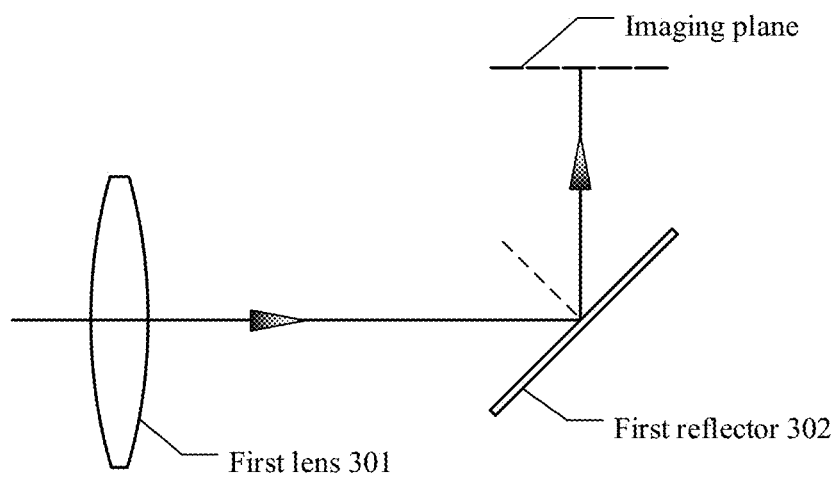
FIG. 3C is a structural diagram of an optical path of an optical image stabilization apparatus according to an embodiment of this application.

In FIG. 3A or FIG. 3B, a positional relationship among the first lens 301, the first reflector 302, the position sensor 303, and the control component 304 is briefly described. Refer to FIG. 3C below. FIG. 3C is a schematic diagram of an embodiment of a positional relationship between the first lens 301 and the first reflector 302.

Figure 3D:
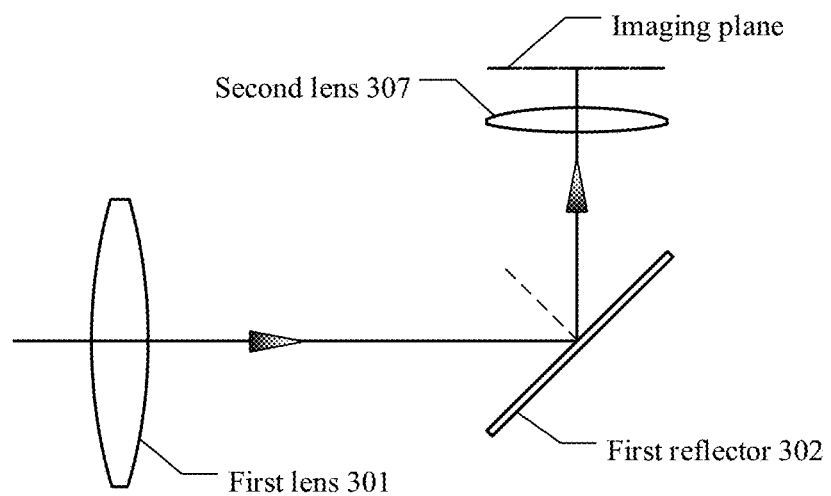
FIG. 3D is a structural diagram of an optical path of an optical image stabilization apparatus according to another embodiment of this application.

In a specific embodiment, the optical image stabilization apparatus may further include a second lens 307. Refer to FIG. 3D below for details. FIG. 3D is a schematic diagram of an embodiment of a positional relationship among the first lens 301, the second lens 307, the first reflector 302, and the imaging plane. As shown in FIG. 3D, the second lens 307 is disposed between the first reflector 302 and the imaging plane. After being reflected by the first reflector 302, the optical signal is projected onto the second lens 307, and after passing through the second lens 307, the optical signal is finally projected onto the imaging plane. It should be noted that the second lens 307 plays a role of assisting with imaging, may be a convex lens or a concave lens, and may include one lens or a combination of a plurality of lenses. A specific quantity and a specific form are not limited herein.

Figure 4A:
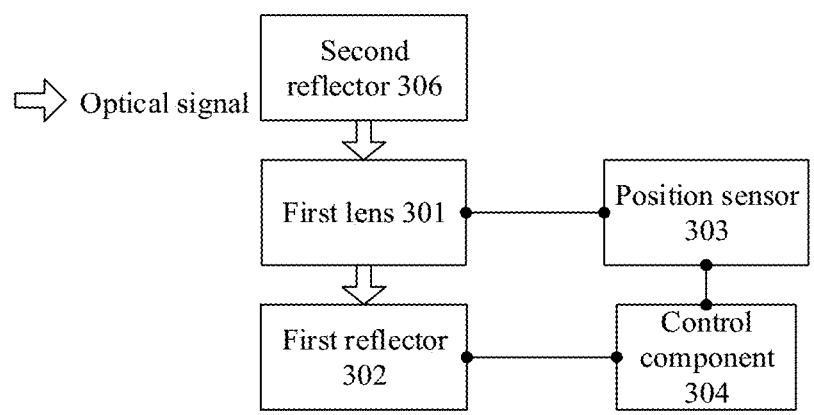
FIG. 4A is a schematic diagram of an optical image stabilization apparatus according to another embodiment of this application.

In a specific embodiment, based on FIG. 3A, reference is made to FIG. 4A below for details. FIG. 4A is a schematic diagram of another embodiment of an optical image stabilization apparatus according to an embodiment of this application. The optical image stabilization apparatus may further include:

a second reflector 306.

The second reflector 306 and the first reflector 302 are respectively located on two sides of the first lens 301. After obtaining an optical signal, the second reflector 306 reflects the obtained optical signal to the first lens 301. Then, the optical signal is reflected by the first reflector 302, and is finally projected onto an imaging plane.

When the first lens 301 shakes, the control component 304 may further control, based on shaking information of the first lens 301 that is detected by the position sensor 303, the second reflector 306 to rotate in a second preset direction, where the second preset direction is not parallel to the first preset direction or a normal direction of the second reflector 306. Therefore, when the second reflector 306 rotates, a direction of the optical path of the optical signal may also be changed through driving, to achieve an image stabilization effect. In addition, it should be noted that, rotational motion of the second reflector 306 by using the second preset direction as an axis and the rotational motion of the first reflector 302 by using the first preset direction as the axis may be performed simultaneously or separately. This is specifically controlled by the control component 304 based on the shaking information. When the rotational motion of the second reflector 306 by using the second preset direction as the axis and the rotational motion of the first reflector 302 by using the first preset direction as the axis are performed simultaneously, a dual-axis image stabilization effect may be achieved through combination.

Figure 4B:
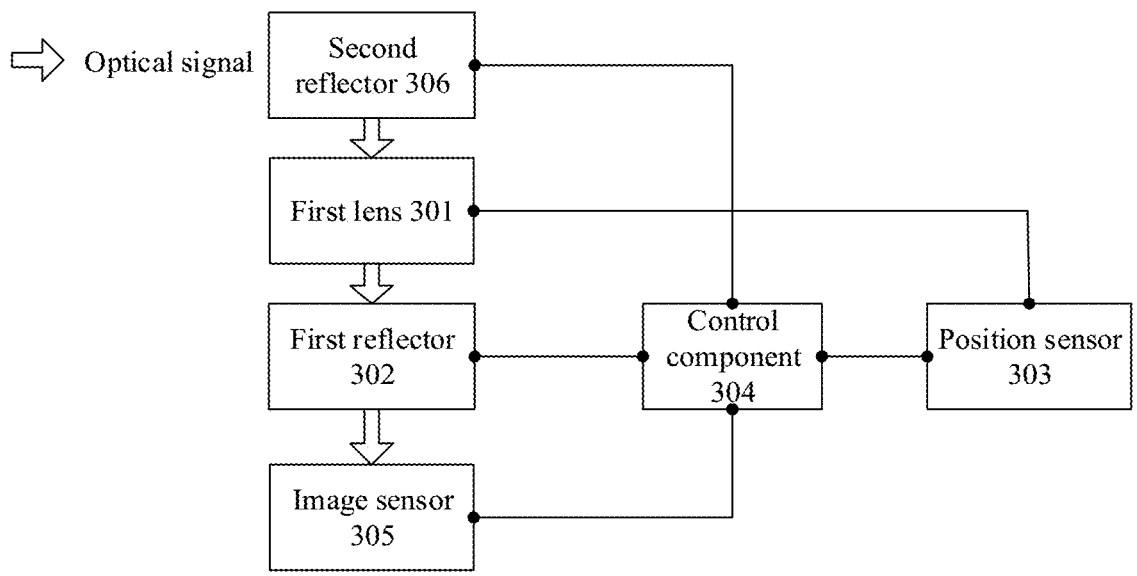
FIG. 4B is a schematic diagram of an optical image stabilization apparatus according to another embodiment of this application.

In a specific embodiment, based on the embodiment shown in FIG. 4A, reference is made to FIG. 4B below for details. FIG. 4B is a schematic diagram of another embodiment of an optical image stabilization apparatus according to an embodiment of this application. The optical image stabilization apparatus may further include:

an image sensor 305 connected to the control component 304, where a photosensitive surface of the image sensor 305 is the imaging plane.

After the optical signal is projected onto the imaging plane, that is, the photosensitive surface of the image sensor 305, the image sensor 305 detects acutance information of an image formed after the optical signal is projected onto the photosensitive surface, and sends the acutance information to the control component 304. Therefore, the control component 304 controls, based on the acutance information, the first reflector 302 to move. When the first reflector 302 moves, a length of the optical path of the optical signal changes as the first reflector 302 moves, and the optical path is a propagation path of the optical signal from the first lens 301 to the imaging plane.

It should be noted that a direction in which the first reflector 302 moves may be preset, for example, may be set to a direction of the optical path or a normal direction of a reflection surface of the first reflector 302. When the first reflector 302 moves, the length of the optical path of the optical signal also changes accordingly, that is, an image distance is changed, so that the optical signal can be clearly imaged on the photosensitive surface, thereby achieving a focusing effect.

Figure 4C:
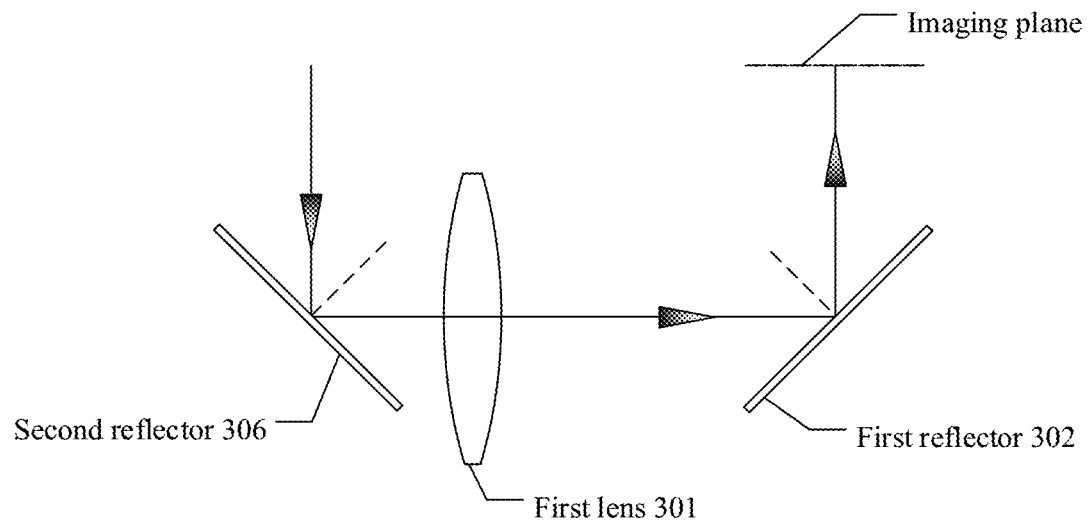
FIG. 4C is a structural diagram of an optical path of an optical image stabilization apparatus according to another embodiment of this application.

In FIG. 4A or FIG. 4B, a positional relationship among the first lens 301, the first reflector 302, the second reflector 306, the position sensor 303, and the control component 304 is briefly described. Refer to FIG. 4C below. FIG. 4C is a schematic diagram of an embodiment of a positional relationship among the first lens 301, the first reflector 302, and the second reflector 306.

Figure 4D:
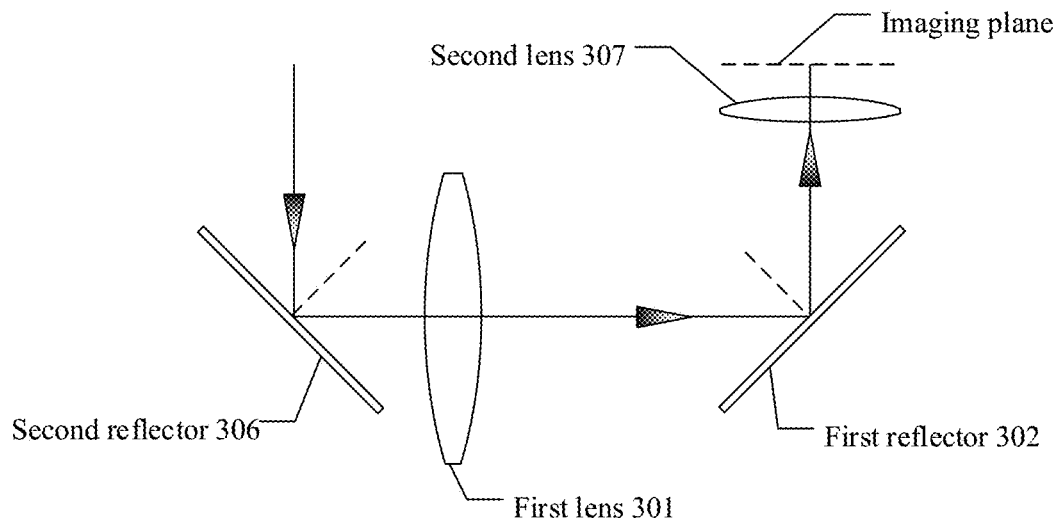
FIG. 4D is a structural diagram of an optical path of an optical image stabilization apparatus according to another embodiment of this application.

In a specific embodiment, the optical image stabilization apparatus may further include a second lens 307. Refer to FIG. 4D below for details. FIG. 4D is a schematic diagram of an embodiment of a positional relationship among the first lens 301, the second lens 307, and the first reflector 302. As shown in FIG. 4D, the second lens 307 is disposed between the first reflector 302 and the imaging plane. After being reflected by the first reflector 302, the optical signal is projected onto the second lens 307, and after passing through the second lens 307, the optical signal is finally projected onto the imaging plane. It should be noted that the second lens 307 plays a role of assisting with imaging, may be a convex lens or a concave lens, and may be one lens or a combination of a plurality of lenses. A specific quantity and a specific form are not limited herein.

Figure 4E:
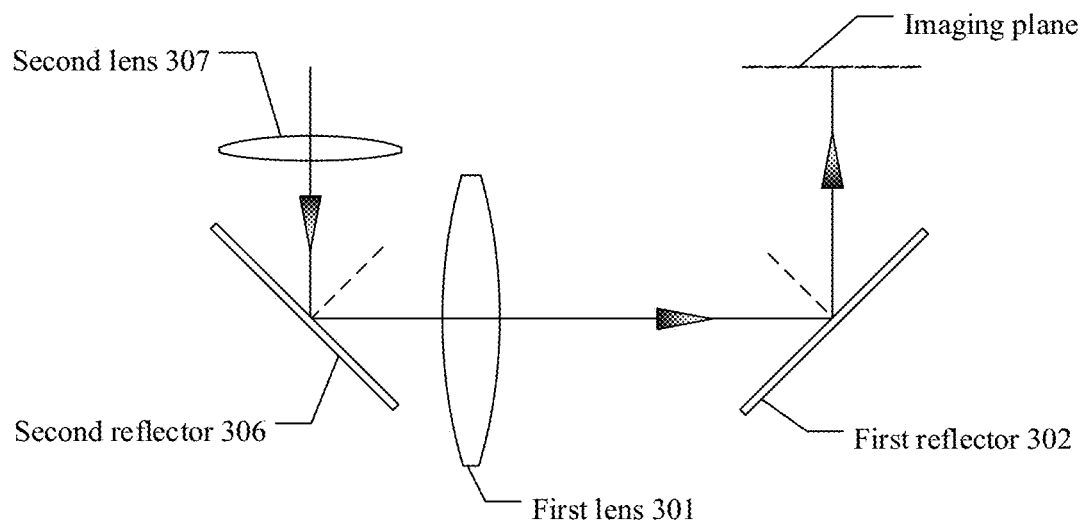
FIG. 4E is a structural diagram of an optical path of an optical image stabilization apparatus according to another embodiment of this application.

In a specific embodiment, the optical image stabilization apparatus may further include a second lens 307. Refer to FIG. 4E below for details. FIG. 4E is a schematic diagram of another embodiment of a positional relationship among the first lens 301, the second lens 307, and the first reflector 302. As shown in FIG. 4E, the second lens 307 is disposed on an outer side of the second reflector 306, and after passing through the second lens 307, the optical signal is projected onto the second reflector 306. Then, the optical signal reflected by the second reflector 306 passes through the first lens 301, and is then reflected by the first reflector 302, and is finally projected onto the imaging plane. It should be noted that the second lens 307 plays a role of assisting with imaging, may be a convex lens or a concave lens, and may be one lens or a combination of a plurality of lenses. A specific quantity and a specific form are not limited herein.

Figure 4F:
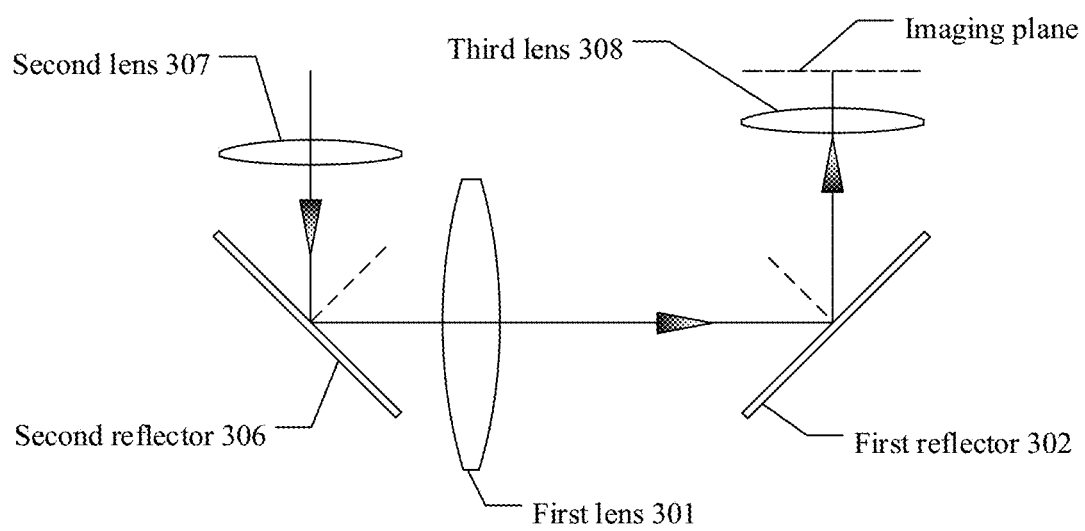
FIG. 4F is a structural diagram of an optical path of an optical image stabilization apparatus according to another embodiment of this application.

In a specific embodiment, the optical image stabilization apparatus may further include a second lens 307 and a third lens 308. Refer to FIG. 4F below for details. FIG. 4F is a schematic diagram of an embodiment of a positional relationship among the first lens 301, the second lens 307, the third lens 308, and the first reflector 302. As shown in FIG. 4F, the second lens 307 is disposed on an outer side of the second reflector 306, and the third lens 308 is disposed on an optical path between the first reflector 302 and the imaging plane. The optical signal sequentially passes through the second lens 307, the second reflector 306, the first lens 301, the first reflector 302, and the third lens 308, and is finally projected onto the imaging plane. It should be noted that the second lens 307 and the third lens 308 play a role of assisting with imaging, and each of the second lens 307 and the third lens 308 may be a convex lens or a concave lens, and may be one lens or a combination of a plurality of lenses. A specific quantity and a specific form are not limited herein.

Figure 5A:
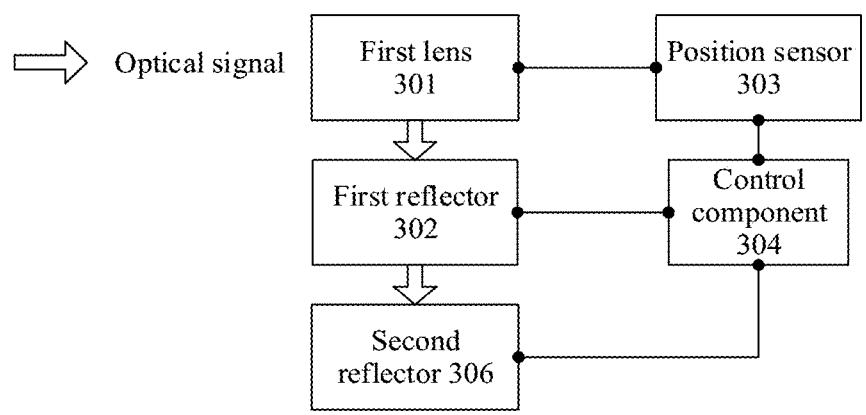
FIG. 5A is a schematic diagram of an optical image stabilization apparatus according to another embodiment of this application.

In a specific embodiment, based on FIG. 3A, reference is made to FIG. 5A below for details. FIG. 5A is a schematic diagram of another embodiment of an optical image stabilization apparatus according to an embodiment of this application. The optical image stabilization apparatus may further include:

a second reflector 306.

A placement position of the second reflector 306 is shown in FIG. 5A, and is located between the first reflector 302 and the imaging plane. After being reflected by the first reflector 302, an optical signal is projected onto the second reflector 306, and is reflected by the second reflector 306 to the imaging plane.

When the first lens 301 shakes, the control component 304 is further configured to control, based on shaking information of the first lens 301 that is detected by the position sensor 303, the second reflector 306 to rotate by using a second preset direction as an axis, where the second preset direction is not parallel to the first preset direction or a normal direction of the second reflector 306. Therefore, when the second reflector 306 rotates, a direction of the optical path of the optical signal may also be changed through driving, to achieve an image stabilization effect. In addition, it should be noted that, rotational motion of the second reflector 306 by using the second preset direction as the axis and the rotational motion of the first reflector 302 by using the first preset direction as the axis may be performed simultaneously or separately. This is specifically controlled by the control component 304 based on the shaking information. When the rotational motion of the second reflector 306 by using the second preset direction as the axis and the rotational motion of the first reflector 302 by using the first preset direction as the axis are performed simultaneously, a dual-axis image stabilization effect may be achieved.

Figure 5B:
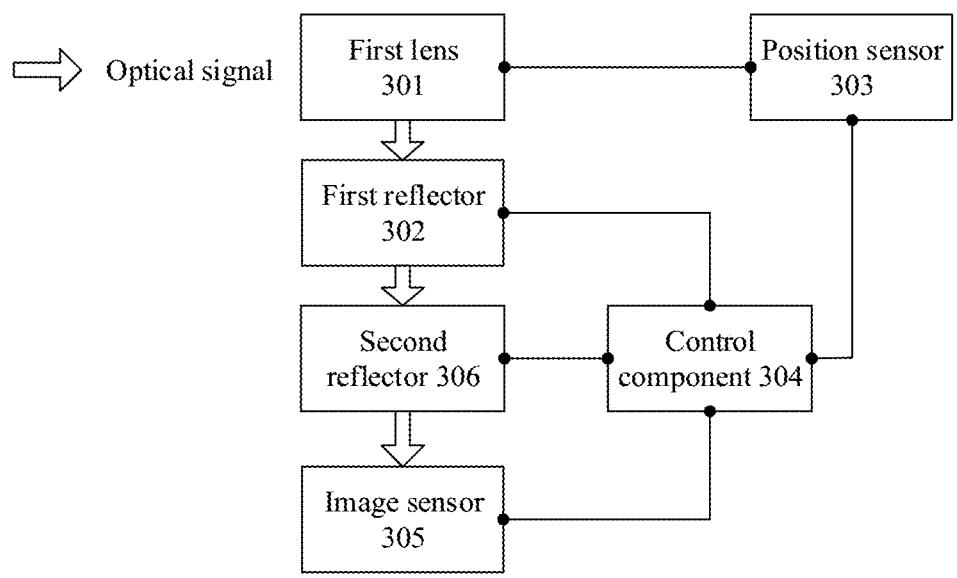
FIG. 5B is a schematic diagram of an optical image stabilization apparatus according to another embodiment of this application.

In a specific embodiment, based on FIG. 5A, reference is made to FIG. 5B for details. FIG. 5B is a schematic diagram of another embodiment of an optical image stabilization apparatus according to an embodiment of this application. The optical image stabilization apparatus may further include:

an image sensor 305 connected to the control component 304, where a photosensitive surface of the image sensor 305 is the imaging plane.

After the optical signal is projected onto the imaging plane, that is, the photosensitive surface of the image sensor 305, the image sensor 305 detects acutance information of an image formed after the optical signal is projected onto the photosensitive surface, and sends the acutance information to the control component 304. After receiving the acutance information detected by the image sensor 305, the control component 304 controls, based on the acutance information, the first reflector 302 and/or the second reflector 306 to move. When the first reflector 302 and/or the second reflector 306 move/moves, a length of the optical path of the optical signal changes as the first reflector 302 and/or the second reflector 306 move/moves, and the optical path is a propagation path of the optical signal from the first lens 301 to the imaging plane.

It should be noted that a direction in which the first reflector 302 and/or the second reflector 306 move/moves may be preset, for example, may be set to a direction of the optical path or a normal direction of a reflection surface of the first reflector 302 and/or the second reflector 306. When the first reflector 302 and/or the second reflector 306 move/moves, the length of the optical path of the optical signal also changes accordingly, that is, an image distance is changed, so that the optical signal can be clearly imaged on the photosensitive surface, thereby achieving a focusing effect.

Figure 5C:
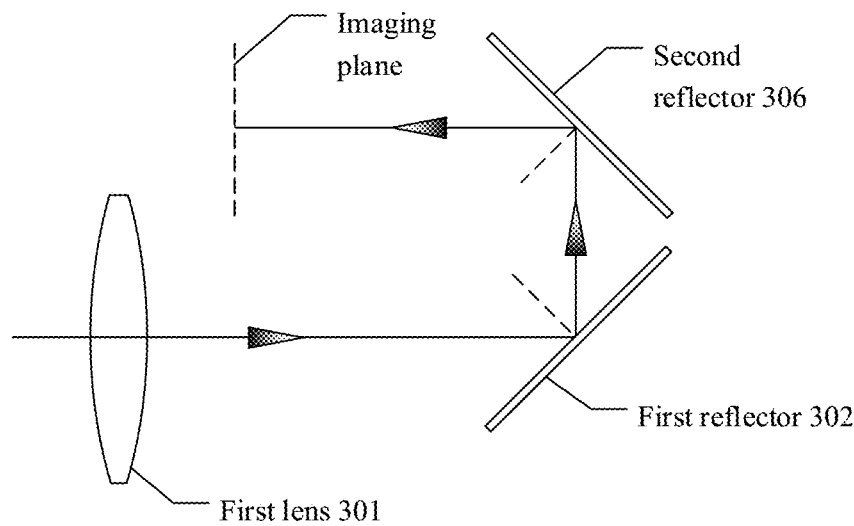
FIG. 5C is a structural diagram of an optical path of an optical image stabilization apparatus according to another embodiment of this application.

In FIG. 5A or FIG. 5B, a positional relationship among the first lens 301, the first reflector 302, the second reflector 306, and the imaging plane is briefly described. Refer to FIG. 5C below. FIG. 5C is a schematic diagram of an embodiment of a positional relationship among the first lens 301, the first reflector 302, and the second reflector 306.

Figure 5D:
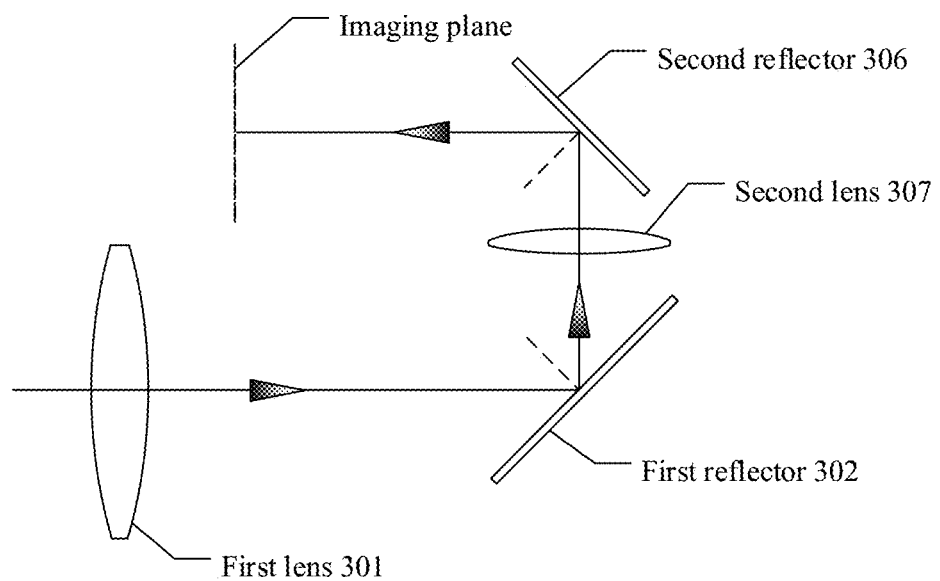
FIG. 5D is a structural diagram of an optical path of an optical image stabilization apparatus according to another embodiment of this application.

In a specific embodiment, the optical image stabilization apparatus may further include a second lens 307. Refer to FIG. 5D below for details. FIG. 5D is a schematic diagram of another embodiment of a positional relationship among the first lens 301, the second lens 307, the first reflector 302, and the second reflector 306. As shown in FIG. 5D, the second lens 307 is disposed between the first reflector 302 and the second reflector 306. After being reflected by the first reflector 302, an optical signal passes through the second lens 307 and is projected onto the second reflector 306, and after being reflected by the second reflector 306, the optical signal is finally projected onto the imaging plane. It should be noted that the second lens 307 plays a role of assisting with imaging, may be a convex lens or a concave lens, and may be one lens or a combination of a plurality of lenses. A specific quantity and a specific form are not limited herein.

Figure 5E:
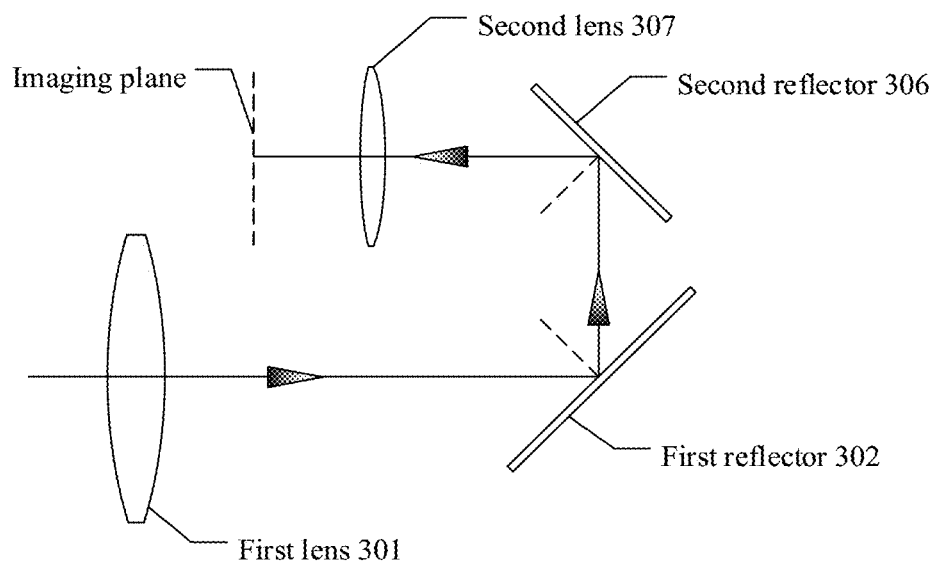
FIG. 5E is a structural diagram of an optical path of an optical image stabilization apparatus according to another embodiment of this application.

In a specific embodiment, the optical image stabilization apparatus may further include a second lens 307. Refer to FIG. 5E below for details. FIG. 5E is a schematic diagram of another embodiment of a positional relationship among the first lens 301, the second lens 307, the first reflector 302, and the second reflector 306. As shown in FIG. 5E, the second lens 307 is disposed between the second reflector 306 and the imaging plane. After being reflected by the second reflector 306, an optical signal passes through the second lens 307 and is finally projected onto the imaging plane. It should be noted that the second lens 307 plays a role of assisting with imaging, may be a convex lens or a concave lens, and may be one lens or a combination of a plurality of lenses. A specific quantity and a specific form are not limited herein.

Figure 5F:
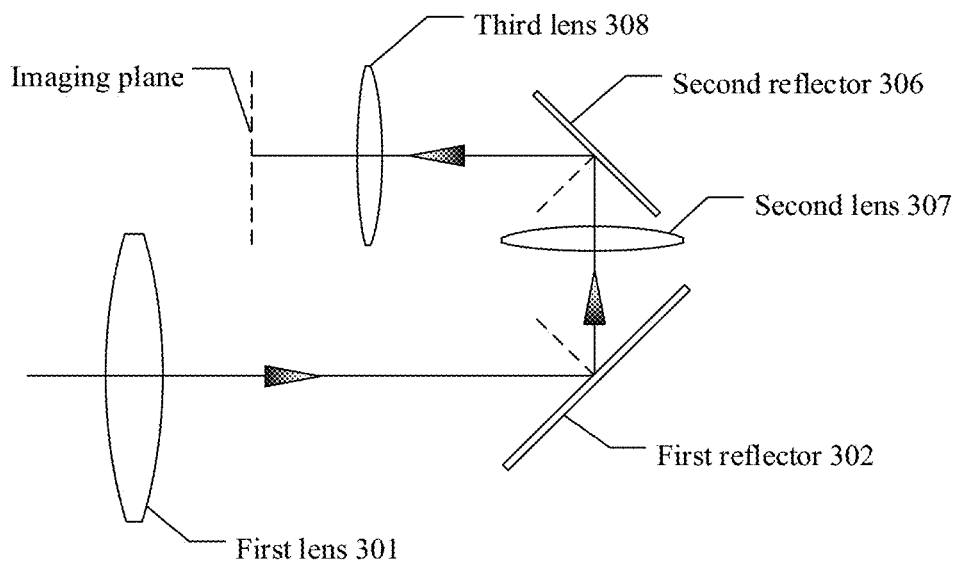
FIG. 5F is a structural diagram of an optical path of an optical image stabilization apparatus according to another embodiment of this application.

In a specific embodiment, the optical image stabilization apparatus may further include a second lens 307 and a third lens 308. Refer to FIG. 5F below for details. FIG. 5F is a schematic diagram of an embodiment of a positional relationship among the first lens 301, the second lens 307, the third lens 308, the first reflector 302, and the second reflector 306. As shown in FIG. 5F, the second lens 307 is disposed between the first reflector 302 and the second reflector 306, and the third lens 308 is disposed between the second reflector 306 and the imaging plane. An optical signal sequentially passes through the first lens 301, the first reflector 302, the second lens 307, the second reflector 306, and the third lens 308, and is finally projected onto the imaging plane. It should be noted that the second lens 307 and the third lens 308 play a role of assisting with imaging, and each of the second lens 307 and the third lens 308 may be a convex lens or a concave lens, and may be one lens or a combination of a plurality of lenses. A specific quantity and a specific form are not limited herein.

It should be noted that, a positional relationship between reflectors, a positional relationship between lenses, and a positional relationship between a reflector and a lens embodied in the optical image stabilization apparatus shown in FIG. 3C, FIG. 3D, FIG. 4B to FIG. 4F, and FIG. 5B to FIG. 5F are merely used as examples for description. Specifically, specific positions of lenses and reflectors, for example, setting of a distance and an included angle between the first lens 301 and each reflector, setting of a distance, a position, and an included angle between lenses, and setting of a distance and an included angle between reflectors, are not specifically limited in this embodiment of this application. In actual application, specific positions of each lens and each reflector may be set based on a requirement.

Figure 6A:
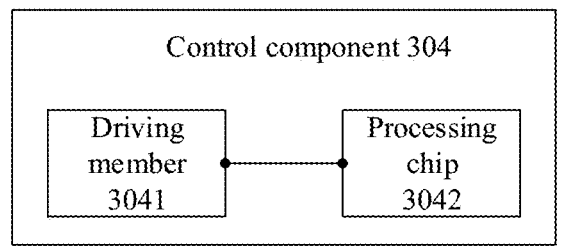
FIG. 6A is a schematic diagram of a control component according to an embodiment of this application.

In a specific embodiment, based on the optical image stabilization apparatus in any specific embodiment in FIG. 3A to FIG. 3D, FIG. 4A to FIG. 4F, and FIG. 5A to FIG. 5F, reference is made to FIG. 6A below for details. FIG. 6A is a schematic diagram of an embodiment of a control component 304 according to an embodiment of this application. The control component 304 includes:

a driving member 3041 and a processing chip 3042.

The processing chip 3042 is configured to receive the shaking information of the first lens 301 that is detected by the position sensor 303 in any specific embodiment in FIG. 3A to FIG. 3D, FIG. 4A to FIG. 4F, and FIG. 5A to FIG. 5F. After processing the shaking information, the processing chip 3042 controls, based on a result of processing the shaking information, the driving member 3041 to drive the first reflector 302 and/or the second reflector 306 to implement the rotational motion described in any specific embodiment in FIG. 3A to FIG. 3D, FIG. 4A to FIG. 4F, and FIG. 5A to FIG. 5F, thereby implementing an image stabilization function.

In a specific embodiment, with reference to the control component 304 shown in FIG. 6A, the processing chip 3042 in the control component 304 is further configured to receive acutance information that is of an image formed after an optical signal is projected onto a photosensitive surface and that is detected by the image sensor 305 in the embodiment shown in FIG. 3B or the image sensors 305 in the embodiments shown in FIG. 4B and FIG. 5B, and after processing the acutance information, the processing chip 3042 is further configured to control, based on a result of processing the acutance information, the driving member 3041 to drive the first reflector 302 and/or the second reflector 306 to perform the moving motion described in any specific embodiment in FIG. 3B, FIG. 4B, or FIG. 5B, thereby achieving a focusing effect.

Figure 6B:
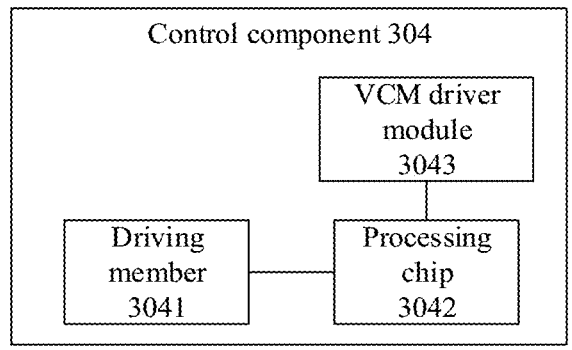
FIG. 6B is a schematic diagram of a control component according to another embodiment of this application.

In a specific embodiment, based on FIG. 6A, reference is made to FIG. 6B below for details. FIG. 6B is a schematic diagram of another embodiment of a control component 304 according to an embodiment of this application. The control component 304 may further include:

a VCM driver module 3043, where the VCM driver module 3043 is connected to the processing chip 3042.

The processing chip 3042 is further configured to receive acutance information that is of an image formed after an optical signal is projected onto a photosensitive surface and that is detected by the image sensor 305 in the embodiment shown in FIG. 3B or the image sensor 305 in the embodiments shown in FIG. 4B and FIG. 5B, and after processing the acutance information, the processing chip 3042 is further configured to control, based on a result of processing the acutance information, the VCM driver module 3043 to drive the first lens 301 to move in a central axis direction of the first lens 301. When the first lens 301 moves in the central axis direction of the first lens 301, a length of a propagation path of the optical signal between the first lens 301 and the photosensitive surface changes, that is, an image distance changes, thereby achieving a focusing effect.

It should be noted that, motion in which the VCM driver module 3043 drives the first lens 301 to move along a central axis and the motion in which the driving member 3041 drives the first reflector 302 and/or the second reflector 306 to move may be performed simultaneously or separately. When the motion in which the VCM driver module 3043 drives the first lens 301 to move along the central axis and the motion in which the driving member 3041 drives the first reflector 302 and/or the second reflector 306 to move are performed simultaneously, a function of fine focusing or coarse focusing may be implemented. Coarse focusing means that a larger focusing range is implemented.

In the foregoing embodiments shown in FIG. 6A and FIG. 6B, the driving component 304 in the optical image stabilization apparatus is briefly described, and the driving member 3041 is further described below.

In a specific embodiment, in a process in which a reflector performs rotational motion or translation motion, a driving manner used by the driving member 3041 may be magnetoelectric driving, piezoelectric driving, or another type of driving. A specific driving manner is not limited in this embodiment of this application.

Figure 7A:
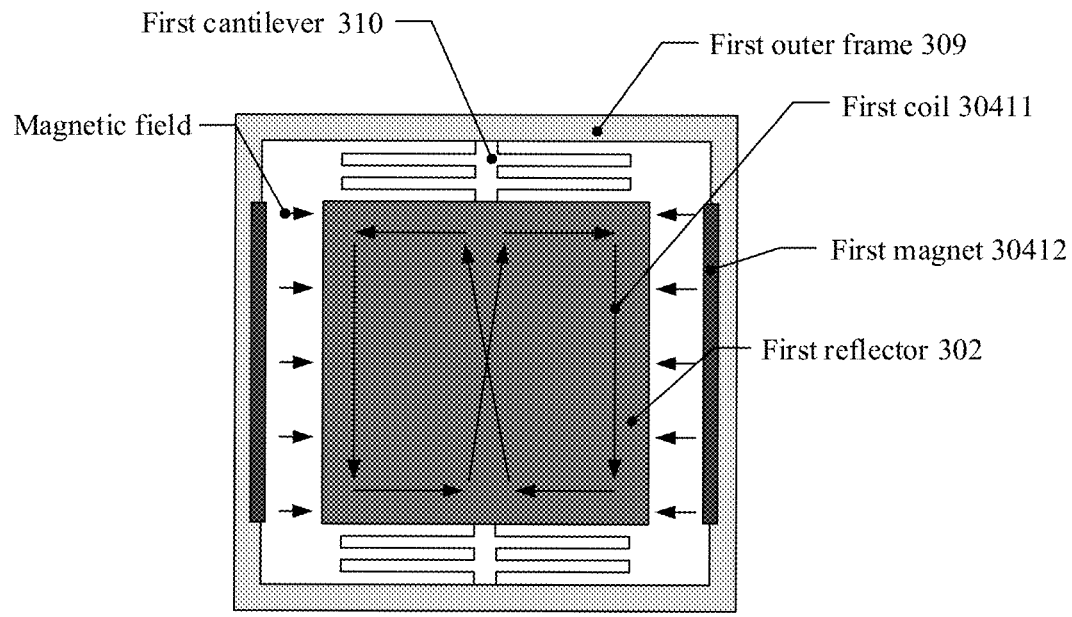
FIG. 7A is a schematic diagram of a driving member according to an embodiment of this application.

In a specific embodiment, based on the optical image stabilization apparatus in any embodiment shown in FIG. 3A to FIG. 3D, FIG. 4A to FIG. 4F, or FIG. 5A to FIG. 5F, reference is made to FIG. 7A below for details. The optical image stabilization apparatus further includes a first outer frame 309 and a first cantilever 310. FIG. 7A is a schematic diagram of an embodiment of a driving member 3041 according to an embodiment of this application. The driving member 3041 may include:

a first coil 30411 and a first magnet 30412.

As shown in FIG. 7A, the first reflector 302 is connected to the first outer frame 309 by using the first cantilever 310, the first coil 30411 is fastened to a rear surface or an edge position of the first reflector 302, and the first magnet 30412 is fastened to the first outer frame 309.

The first coil is a "∞-shaped" coil shown in FIG. 7A, is divided into a left-half coil and a right-half coil, and is bilaterally symmetrical. After electricity is applied to the first coil 30411, an inward ampere force perpendicular to the first reflector 302 is generated under action of a magnetic field between the left-half coil and the first magnet 30412, and an outward ampere force perpendicular to the first reflector 302 is generated under action of a magnetic field between the right-half coil and the first magnet 30412, to drive the first reflector 302 to rotate around a second rotation axis. When the first reflector 302 needs to be controlled to rotate in a reverse direction, a current in a direction opposite to a direction shown in FIG. 7A is supplied to the first coil 30411.

After receiving shaking information of the first lens 301 that is detected by the position sensor 303, the processing chip 3042 processes the shaking information, and controls, based on a processing result, an amount of electricity applied to the first coil 30411. After electricity is applied to the first coil 30411, under action of a magnetic field of the first magnet 30412, ampere forces in opposite directions are respectively generated on a left half and a right half of the first coil 30411, to drive the first reflector 302 fixedly connected to the first coil 30411 to rotate by using a first preset direction as an axis. A rotation axis may be the first cantilever, and in this case, the first preset direction is a direction of the first cantilever.

It should be noted that, that the processing chip 3042 controls, based on a processing result, an amount of electricity applied to the first coil 30411 includes controlling a current direction and a current value of a current in the first coil 30411, to control a rotation direction of the first reflector 302 and a value of a rotation angle of the first reflector 302.

Figure 7B:
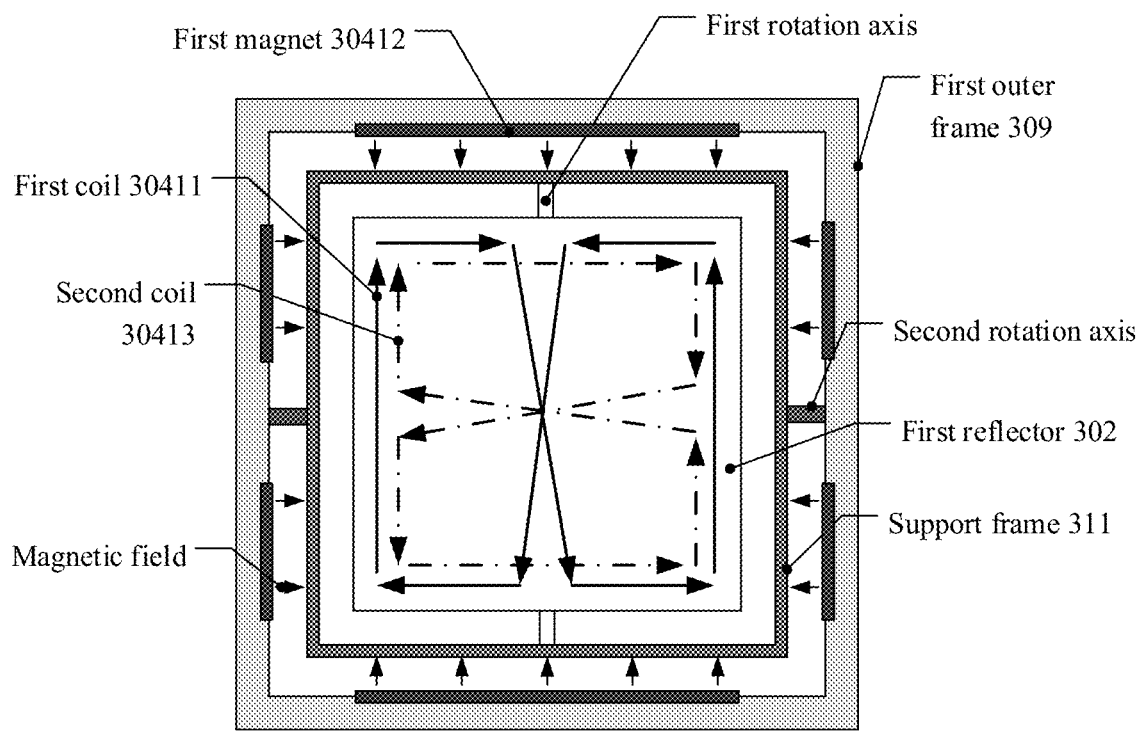
FIG. 7B is a schematic diagram of a driving member according to another embodiment of this application.

In a specific embodiment, based on the driving member 3041 in the embodiment shown in FIG. 7A, reference is made to FIG. 7B below for details. The optical image stabilization apparatus further includes a support frame 311. FIG. 7B is a schematic diagram of another embodiment of a driving member 3041 according to an embodiment of this application. The driving member 3041 may further include:

a second coil 30413.

As shown in FIG. 7B, the second coil 30413 is fastened to a rear surface or an edge position of the first reflector 302 and is insulated from the first coil 30411. The support frame 311 is connected to the first reflector 302 by using a first rotation axis, and is connected to the first outer frame 309 by using the second rotation axis.

The second coil 30413 is an "8-shaped" coil, is similar to a shape obtained after the first coil is rotated by 90 degrees, is divided into an upper-half coil and a lower-half coil, and is longitudinally symmetrical. After electricity is applied to the second coil 30413, an inward ampere force perpendicular to the first reflector 302 is generated under action of a magnetic field between the upper-half coil and the first magnet 30412, and an outward ampere force perpendicular to the first reflector 302 is generated under action of a magnetic field between the lower-half coil and the first magnet 30412, to drive the first reflector 302 to rotate around the second rotation axis. When the first reflector 302 needs to be controlled to rotate in a reverse direction, a current in a direction opposite to a direction shown in FIG. 7B is supplied to the second coil 30413.

After receiving shaking information of the first lens 301 that is detected by the position sensor 303, the processing chip 3042 processes the shaking information, and controls, based on a processing result, an amount of electricity applied to the second coil 30413. After electricity is applied to the second coil 30413, under action of a magnetic field of the first magnet 30412, ampere forces in opposite directions are respectively generated on an upper half and a lower half of the second coil 30413, to drive the first reflector 302 fixedly connected to the second coil 30413 to rotate by using a second preset direction as an axis.

In this embodiment, the first preset direction is a direction of the second rotation axis, and the second preset direction is a direction of the first rotation axis.

Figure 7C:
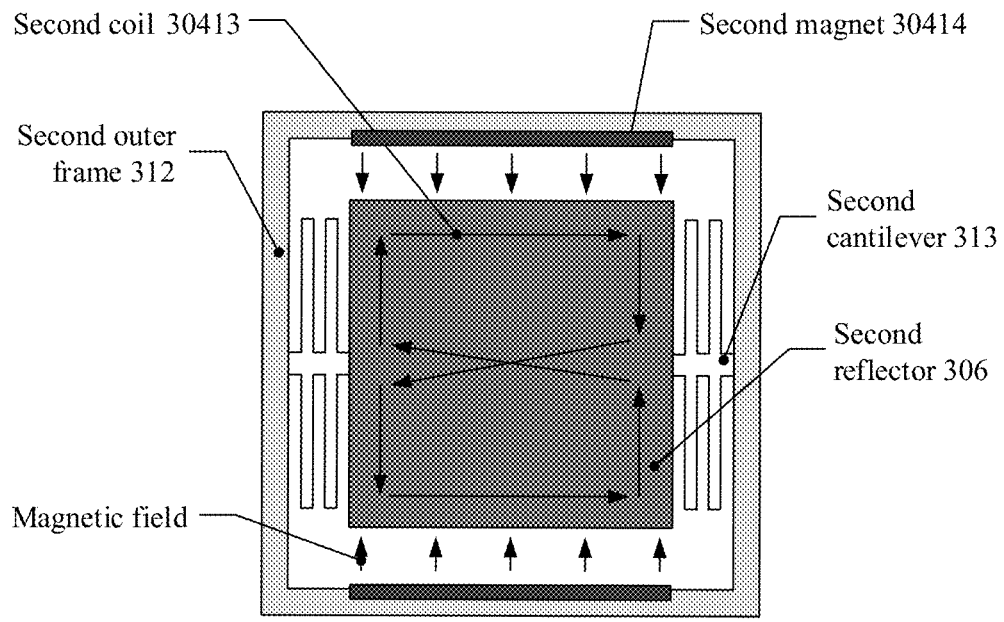
FIG. 7C is a schematic diagram of a driving member according to another embodiment of this application.

In a specific embodiment, based on the optical image stabilization apparatus in any embodiment shown in FIG. 4A to FIG. 4F or FIG. 5A to FIG. 5F, reference is made to FIG. 7C below for details. The optical image stabilization apparatus further includes a second outer frame 312 and a second cantilever 313. FIG. 7C is a schematic diagram of another embodiment of a driving member 3041 according to an embodiment of this application. The driving member 3041 may further include:

a second coil 30413 and a second magnet 30414.

As shown in FIG. 7C, the second reflector 306 is connected to the second outer frame 312 by using the second cantilever 313, the second coil 30413 is fastened to a rear surface or an edge position of the second reflector 306, and the second magnet 30414 is fastened to the second outer frame 312. The second coil 30413 is an "8-shaped" coil shown in FIG. 7C.

After receiving shaking information of the first lens 301 that is detected by the position sensor 303, the processing chip 3042 processes the shaking information, and controls, based on a processing result, an amount of electricity applied to the second coil 30413. After electricity is applied to the second coil 30413, under action of a magnetic field of the second magnet 30414, ampere forces in opposite directions are respectively generated on an upper half and a lower half of the second coil 30413, to drive the second reflector 306 fixedly connected to the second coil 30413 to rotate by using a second preset direction as an axis.

In this embodiment, the second preset direction may be a direction of the second cantilever 313.

Figure 7D:
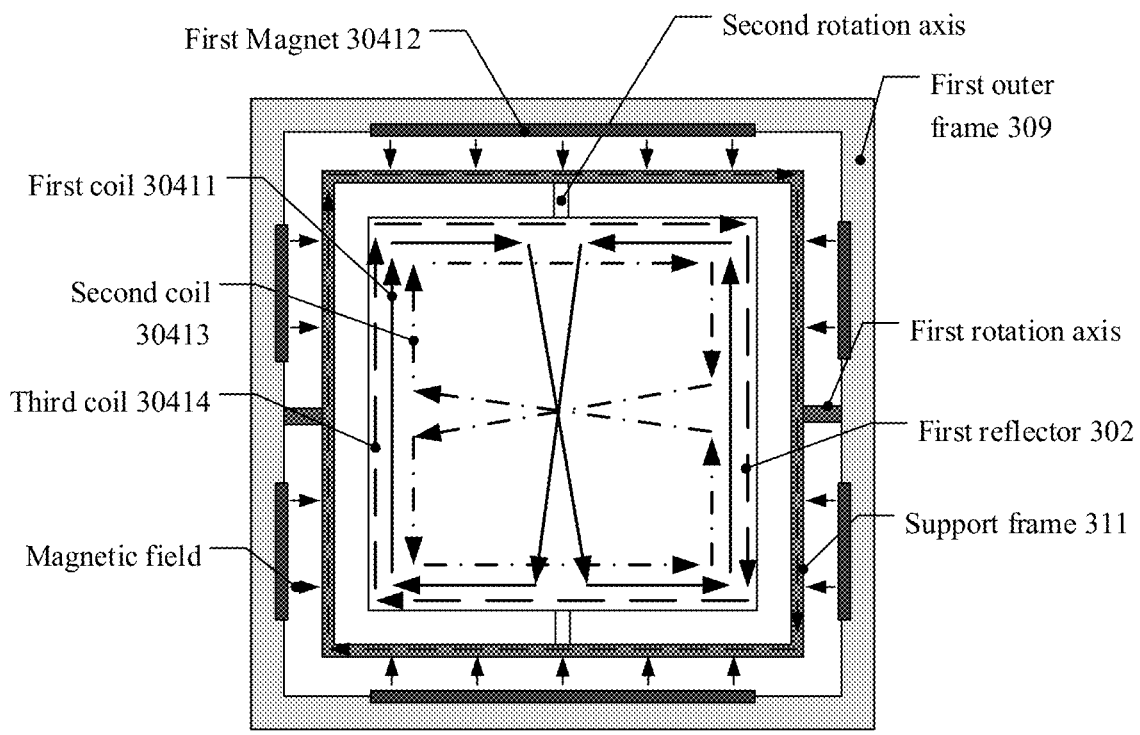
FIG. 7D is a schematic diagram of a driving member according to another embodiment of this application.

In a specific embodiment, based on the optical image stabilization apparatus in the embodiment shown in FIG. 3B, FIG. 4B, or FIG. 5B, the optical image stabilization apparatus includes a first outer frame 309 and a support frame 311. Refer to FIG. 7D below for details. FIG. 7D is a schematic diagram of an embodiment of a driving member 3041 according to an embodiment of this application. The driving member 3041 may include:

a first coil 30411, a first magnet 30412, a second coil 30413, and a third coil 30414.

For the first coil 30411 and the first magnet 30412, refer to related descriptions of the first coil 30411 and the first magnet 30412 in the embodiment shown in FIG. 7A. For the support frame 311 and the second coil 30413, refer to related descriptions of the support frame 311 and the second coil 30413 in the embodiment shown in FIG. 7B. Details are not described herein again.

As shown in FIG. 7D, the third coil 30414 is fastened to a rear surface or an edge position of the first reflector 302, and is insulated from the first coil 30411 and the second coil 30413. Alternatively, the third coil 30414 may be fastened to the support frame 311.

After receiving acutance information that is of an image formed after an optical signal is projected onto a photosensitive surface and that is detected by the image sensor 305, the processing chip 3042 processes the acutance information, and controls, based on a processing result, an amount of electricity applied to the third coil 30414. After electricity is applied to the third coil 30414, an ampere force perpendicular to a plane on which the third coil 30414 is located is generated under action of a magnetic field of the first magnet 30412, to drive the first reflector 302 fixedly connected to the third coil 30414 to move. It should be noted that, that the processing chip 3042 controls, based on a processing result, an amount of electricity applied to the third coil 30414 includes controlling a current direction and a current value of a current in the third coil 30414, to control a magnitude and a direction of movement of the first reflector 302.

In a specific embodiment, the third coil 30414 in the driving member 3041 shown in FIG. 7D may alternatively be disposed on the second reflector 306 in the driving member 3041 shown in FIG. 7C, and may be specifically fastened to a rear surface or an edge position of the second reflector 306, and is insulated from the second coil 30413. Specific disposing is similar to that in FIG. 7D, and details are not described herein again.

Figure 7E:
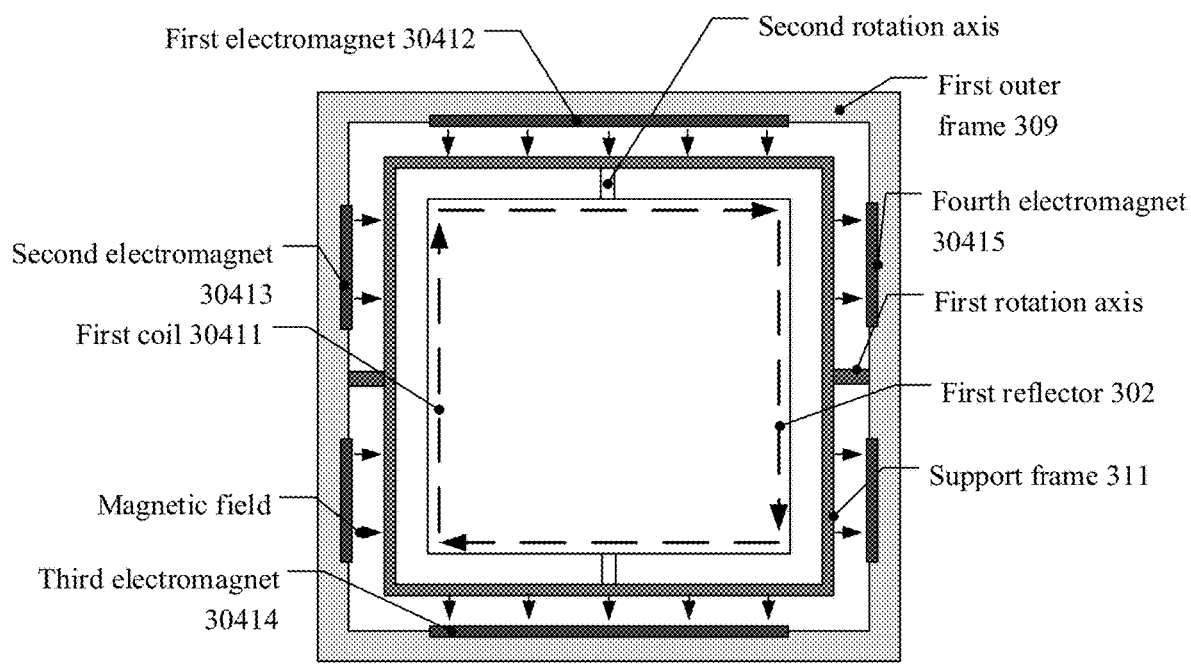
FIG. 7E is a schematic diagram of a driving member according to another embodiment of this application.

In a specific embodiment, based on the optical image stabilization apparatus in any embodiment shown in FIG. 3A to FIG. 3D, FIG. 4A to FIG. 4F, or FIG. 5A to FIG. 5F, reference is made to FIG. 7E below for details. The optical image stabilization apparatus further includes a first outer frame 309 and a support frame 311. FIG. 7E is a schematic diagram of another embodiment of a driving member 3041 according to an embodiment of this application. The driving member 3041 may include:

a first coil 30411, a first electromagnet 30412, a second electromagnet 30413, a third electromagnet 30414, and a fourth electromagnet 30415. A structure of the support frame 311 is similar to that of the support frame 311 described in FIG. 7B, and details are not described herein again.

As shown in FIG. 7E, the first coil 30411 is a rectangular coil or a square coil, and a current in a clockwise direction or a counterclockwise direction may flow through the first coil 30411. The first reflector 302 is connected to the support frame 311 by using a second rotation axis, the support frame 311 is connected to the outer frame 309 by using a first rotation axis, the first coil 30411 is disposed on and fastened to a rear surface or an edge position of the first reflector 302, and the first electromagnet 30412 and the second electromagnet 30413 are separately fastened to the outer frame 309.

After receiving shaking information of the first lens 301 that is detected by the position sensor 303, the processing chip 3042 processes the shaking information, and controls, based on a processing result, electricity applied to the first coil 30411, for example, controls a current value and a current direction, so that ampere forces in a same direction or in different directions are respectively generated on four sides of the first coil under action of a magnetic field, to drive the first reflector 302 fixedly connected to the first coil to perform rotational motion or movement motion, thereby implementing an image stabilization function or a focusing function.

For example, as shown in FIG. 7E, a current shown in the figure is applied to the first coil 30411, the second electromagnet 30413 and the fourth electromagnet 30415 are controlled not to generate a magnetic field (in other words, no electricity is applied to coils of the second electromagnet 30413 and the fourth electromagnet 30415), and the first electromagnet 30412 and the third electromagnet 30414 are controlled to generate same magnetic fields shown in FIG. 7E. Therefore, with reference to FIG. 7E, it can be learned that conducting wires in an upper half and a lower half of the first coil 30411 separately act with the magnetic fields, thereby generating ampere forces in opposite directions, to drive the first reflector 302 to rotate around the first rotation axis. Similarly, the second electromagnet 30413 and the fourth electromagnet 30415 may alternatively be controlled to generate magnetic fields in a same direction, and the first electromagnet 30412 and the third electromagnet 30414 are controlled not to generate a magnetic field. In this way, the first reflector is controlled to rotate around the second rotation axis. Similarly, it can be learned with reference to FIG. 7E that movement or rotation in another case may alternatively be implemented by controlling electricity applied to the first coil 30411 and magnetic fields of the first electromagnet 30412, the second electromagnet 30413, the third electromagnet 30414, and the fourth electromagnet 30415. Details are not described herein.

Figure 8:
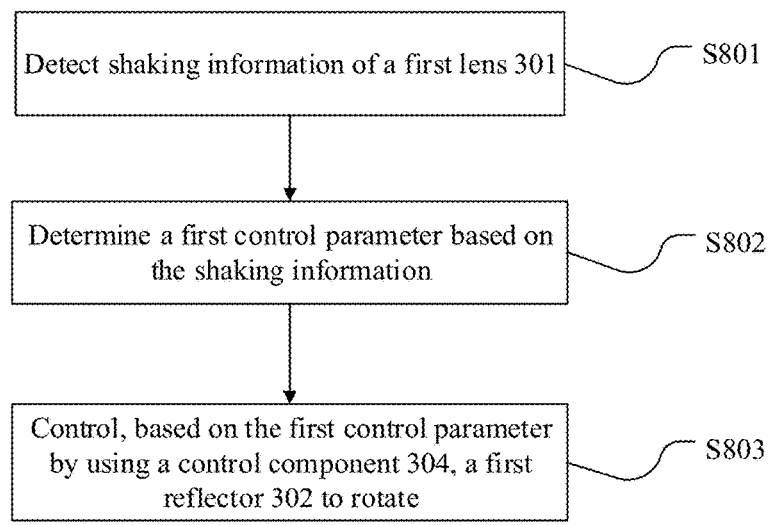
FIG. 8 is a schematic diagram of a control method according to an embodiment of this application.

In the foregoing accompanying drawings, components of the optical image stabilization apparatus are described. Refer to FIG. 8 below for details. With reference to the structures shown in FIG. 6B and FIG. 7D, the following describes a method for controlling movement of a first reflector 302 and a first lens 301 based on shaking information and acutance information. FIG. 8 is a schematic diagram of an embodiment of a control method according to an embodiment of this application. The method may include the following steps.

S801: An optical image stabilization apparatus detects shaking information of a first lens 301.

In a specific embodiment, when the first lens 301 shakes, a position sensor 303 in the optical image stabilization apparatus detects the shaking information of the first lens 301, such as a shaking displacement, a shaking frequency, and a shaking direction. It should be noted that the position sensor 303 herein is not a specific sensor, but generally means a sensor that can detect the shaking information of the first lens 301.

In a specific embodiment, after an optical signal is projected onto a photosensitive surface of an image sensor 305, the image sensor 305 detects acutance information of an image formed by the optical signal on the photosensitive surface.

S802: The optical image stabilization apparatus determines a first control parameter based on the shaking information.

In a specific embodiment, after receiving the shaking information detected by the position sensor 303, a processing chip 3042 processes the shaking information according to a preset first algorithm to obtain the first control parameter. The preset first algorithm may be subsequently updated by using a network or based on a setting parameter entered by a user. The first control parameter may be specifically a parameter indicating a first reflector 302 to rotate. Specifically, the first control parameter may include rotation direction information and rotation angle information.

In a specific embodiment, after receiving the acutance information detected by the image sensor 305, the processing chip 3042 processes the acutance information according to a preset second algorithm to obtain a second control parameter. The preset second algorithm may be subsequently updated by using a network or based on a setting parameter entered by a user. The second control parameter includes a parameter indicating the first reflector 302 to move and a parameter indicating the first lens 301 to move. Specifically, the second control parameter may include moving direction information and moving distance information.

S803: The optical image stabilization apparatus controls, based on the first control parameter by using a control component 304, the first reflector 302 to rotate.

In a specific embodiment, after determining the first control parameter, the optical image stabilization apparatus may determine, based on the first control parameter, a current direction and a current value of a current that needs to be loaded to a first coil 30411 and a current direction and a current value of a current that needs to be loaded to a second coil 30413. This process may be implemented by using a preset third algorithm. The third algorithm may be subsequently updated by using a network or based on a setting parameter entered by a user.

In a specific embodiment, after determining the second control parameter, the optical image stabilization apparatus may determine, based on the second control parameter, a current direction and a current value of a current that needs to be loaded to a third coil 30414 and a current direction and a current value of a current that needs to be loaded to a VCM driver module 3043. This process may be implemented by using a preset fourth algorithm. The fourth algorithm may be subsequently updated by using a network or based on a setting parameter entered by a user.

It should be noted that, the motion in which the control component 304 controls the first reflector 302 to rotate, the motion in which the control component 304 controls the first reflector 302 to move, and the motion in which the VCM driver module 3043 controls the first lens 301 to move may be performed simultaneously or separately. For details, refer to content described in step S803. Functional effects that can be achieved by the first coil 30411, the second coil 30413, the third coil 30414, and the VCM driver module 3043 after electricity is specifically applied to the first coil 30411, the second coil 30413, the third coil 30414, and the VCM driver module 3043 are shown in the following Table 1. Table 1 is a schematic table of an image stabilization effect and/or a focusing effect that can be achieved in different electricity application cases.

TABLE 1

| Sequence number | First coil 30411 | Second coil 30413 | Third coil 30414 | VCM driver module 3043 | Descriptions |
|---|---|---|---|---|---|
| 1 | + | 0 | 0 | 0 | Image stabilization 1 |
| 2 | + | + | 0 | 0 | Image stabilization 1 + image stabilization 2 |
| 3 | + | + | + | 0 | Image stabilization 1 + image stabilization 2 + focusing 1 |
| 4 | 0 | + | + | 0 | Image stabilization 2 + focusing 1 |
| 5 | 0 | 0 | + | 0 | Focusing 1 |
| 6 | 0 | + | 0 | 0 | Image stabilization 2 |
| 7 | + | 0 | + | 0 | Image stabilization 1 + focusing 1 |
| 8 | + | 0 | 0 | + | Image stabilization 1 + focusing 2 |

| | | | | | -continued |
|---|---|---|---|---|---|
| 9 | + | + | 0 | + | Image stabilization 1 + image stabilization 2 + focusing 2 |
| 10 | + | + | + | + | Image stabilization 1 + image stabilization 2 + focusing 1 + focusing 2 |
| 11 | 0 | + | + | + | Image stabilization 2 + focusing 1 + focusing 2 |
| 12 | 0 | 0 | + | + | Focusing 1 + focusing 2 |
| 13 | 0 | + | 0 | + | Image stabilization 2 + focusing 2 |
| 14 | + | 0 | + | + | Image stabilization 1 + focusing 1 + focusing 2 |
| 15 | 0 | 0 | 0 | + | Focusing 2 |

As shown in Table 1, + indicates that electricity is applied, and a specific direction of a current is set based on a parameter obtained through calculation; 0 indicates a case in which no electricity is applied; image stabilization 1 indicates an image stabilization effect that can be achieved when the first reflector 302 is driven to rotate around a second rotation axis after electricity is applied to the first coil 30411; image stabilization 2 indicates an image stabilization effect that can be achieved when the first reflector 302 is driven to rotate around a first rotation axis after electricity is applied to the second coil 30413; focusing 1 indicates a focusing effect brought when the first reflector 302 moves; and focusing 2 indicates a focusing effect brought when the VCM driver module 3043 drives the first lens 301 to translate along a central axis. Image stabilization and focusing may be performed simultaneously, and focusing 1+focusing 2 can implement focusing in a larger range and fine focusing.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. An optical image stabilization apparatus, comprising a first lens, a first reflector, a position sensor, a control component comprising a first coil, an outer frame, a first cantilever, a magnet, and a processing chip, wherein:
   the first reflector is connected to the outer frame by using the first cantilever;
   the position sensor is connected to the control component, and the first coil is fastened to the first reflector;
   the first coil is fastened to a rear surface of the first reflector;
   the magnet is fastened to the outer frame;
   after passing through the first lens, an optical signal is transmitted to the first reflector;
   the first reflector is configured to reflect the optical signal, wherein the reflected optical signal is projected onto an imaging plane;
   the position sensor is configured to:
      detect shaking information of the first lens; and
      send the shaking information to the control component;
   the control component is configured to:
      control, based on the shaking information, an amount of electricity applied to the first coil; and
      generate forces in opposite directions on two sides of the first reflector to enable the first reflector to rotate by using the first cantilever as an axis, wherein a direction of the first cantilever is a first preset direction, and the first preset direction is not parallel to a normal direction of the first reflector; and
   the processing chip is configured to generate, based on the shaking information, forces in opposite directions on two sides of the first reflector in a second preset direction to enable the first reflector to rotate by using the second preset direction as an axis, wherein the second preset direction is not parallel to either the first preset direction or the normal direction of the first reflector.

2. The optical image stabilization apparatus according to claim 1, wherein:
   the optical image stabilization apparatus further comprises a second reflector;
   the second reflector is configured to:
      receive the optical signal; and
      reflect the optical signal to the first lens; and
   the control component is further configured to control, based on the shaking information, the second reflector to rotate in the second preset direction, wherein the second preset direction is not parallel to a normal direction of the second reflector.

3. The optical image stabilization apparatus according to claim 1, wherein:
   the optical image stabilization apparatus further comprises an image sensor connected to the control component, wherein a photosensitive surface of the image sensor is the imaging plane;
   the image sensor is configured to detect acutance information of an image formed after the optical signal is projected onto the photosensitive surface; and
   the control component is further configured to control, based on the acutance information, the first reflector to move, wherein a length of an optical path of the optical signal changes as the first reflector moves, and the optical path is a propagation path of the optical signal from the first lens to the imaging plane.

4. The optical image stabilization apparatus according to claim 1, wherein:
the optical image stabilization apparatus further comprises a second reflector;
after being reflected by the first reflector, the optical signal is projected onto the second reflector, and is reflected by the second reflector to the imaging plane; and
the control component is further configured to control the second reflector to rotate by using the second preset direction as an axis, wherein the second preset direction is not parallel to a normal direction of the second reflector.

5. The optical image stabilization apparatus according to claim 4, wherein:
the optical image stabilization apparatus further comprises an image sensor connected to the control component, wherein a photosensitive surface of the image sensor is the imaging plane;
the image sensor is configured to detect acutance information of an image formed after the optical signal is projected onto the photosensitive surface; and
the control component is further configured to control, based on the acutance information, at least one of the first reflector or the second reflector to move, wherein a length of an optical path of the optical signal changes as the at least one of the first reflector or the second reflector move, and the optical path is a propagation path of the optical signal from the first lens to the imaging plane.

6. The optical image stabilization apparatus according to claim 2, wherein:
the second reflector is connected to the outer frame by using the first cantilever;
the control component comprises an additional first coil;
the additional first coil is fastened to a rear surface of the second reflector;
and
the processing chip is configured to:
control, based on the shaking information, an amount of electricity applied to the additional first coil; and
generate forces in opposite directions on two sides of the second reflector in the second preset direction to enable the second reflector to rotate by using the second preset direction as the axis.

7. The optical image stabilization apparatus according to claim 3, wherein:
the control component comprises a second coil;
the second coil is fastened to the rear surface of the first reflector;
and
the processing chip is configured to:
control, based on the acutance information, an amount of electricity applied to the second coil; and
generate forces in a same direction for the first reflector to enable the first reflector to move.

8. The optical image stabilization apparatus according to claim 5, wherein:
the outer frame is a first outer frame;
the optical image stabilization apparatus further comprises a second outer frame;
the second reflector is connected to the second outer frame;
the control component comprises a first magnet, a second coil, and a second magnet;
the first coil and the second coil are respectively fastened to the rear surface of the first reflector and a rear surface of the second reflector;
the first magnet and the second magnet are respectively fastened to the first outer frame and the second outer frame; and
the processing chip is configured to:
control, based on the acutance information, an amount of electricity applied to at least one of the first coil or an amount of electricity applied to the second coil, wherein the at least one of the first reflector or the second reflector separately moves.

9. The optical image stabilization apparatus according to claim 3, wherein the control component comprises a voice coil motor (VCM) driver module, and the VCM driver module is configured to drive, based on the acutance information, the first lens to move in a central axis direction.

10. The optical image stabilization apparatus according to claim 1, wherein:
the control component further comprises a second coil, and a third coil;
the first coil, the second coil, and the third coil are insulated from each other;
the third coil is fastened to the rear surface of the first reflector; and
the processing chip is further configured to:
control, based on the shaking information, application of electricity to the third coil; and
generate forces in opposite directions on the two sides of the first reflector in the first preset direction, wherein the first reflector rotates by using the first preset direction as the axis.

11. A control method, used in an optical image stabilization apparatus, wherein the optical image stabilization apparatus comprises a first lens, a first reflector, a position sensor, a control component comprising a first coil fastened to a rear surface of the first reflector, an outer frame, a first cantilever, a magnet fastened to the outer frame, and a processing chip, wherein the first reflector is connected to the outer frame by using the first cantilever, and wherein after passing through the first lens, an optical signal is reflected by the first reflector and is projected onto a photosensitive surface of an image sensor, and the method comprises:
detecting shaking information of the first lens by using the position sensor;
determining a first control parameter based on the shaking information; and
controlling, based on the first control parameter by using the control component, an amount of electricity applied to the first coil;
generating forces in opposite directions on two sides of the first reflector to enable the first reflector to rotate by using the first cantilever as an axis, wherein a direction of the first cantilever is a first preset direction, and the first preset direction is not parallel to a normal direction of the first reflector; and
generate, using the processing chip based on the shaking information, forces in opposite directions on two sides of the first reflector in a second preset direction to enable the first reflector to rotate by using the second preset direction as an axis, wherein the second preset direction is not parallel to either the first preset direction or the normal direction of the first reflector.

12. The method according to claim 11, wherein the optical image stabilization apparatus further comprises the image sensor, and the method further comprises:
detecting, by using the image sensor, acutance information of an image formed after the optical signal is projected onto the photosensitive surface;

determining a second control parameter based on the shaking information and the acutance information; and controlling, based on the second control parameter by using the control component, at least one of the first reflector or the first lens to move.

13. The method according to claim 12, wherein the control component comprises a second coil and a first magnet, both the first coil and the second coil are fastened to the rear surface of the first reflector and are insulated from each other, and the controlling, based on the first control parameter by using the control component, an amount of electricity applied to the first coil comprises:

controlling an electricity application status of the first coil and an electricity application status of the second coil based on the first control parameter, wherein the electricity application status comprises a current value and a current direction of applied electricity, wherein:
after electricity is applied to the first coil and electricity is applied to the second coil, forces in opposite directions on two sides of the first reflector in the first preset direction and forces in opposite directions on the two sides of the first reflector in the second preset direction are separately generated under action of a magnetic field of the first magnet, wherein the first reflector separately rotates by using the first preset direction as an axis and by using the second preset direction as an axis.

14. The method according to claim 13, wherein the control component further comprises a third coil and a voice coil motor (VCM) driver module, the third coil is fastened to the rear surface of the first reflector and is insulated from the first coil and the second coil, the VCM driver module is connected to the first lens, and the controlling, based on the second control parameter by using the control component, at least the first reflector or the first lens to move comprises:

controlling an electricity application status of the third coil and an electricity application status of the VCM driver module based on the second control parameter, wherein the electricity application status comprises a current value and a current direction of applied electricity, wherein:
after electricity is applied to the third coil, the first reflector is driven to move under the action of the magnetic field of the first magnet, and after electricity is applied to the VCM driver module, the first lens is driven to move.

* * * * *